(12) United States Patent
Cooksey et al.

(10) Patent No.: US 7,260,704 B2
(45) Date of Patent: Aug. 21, 2007

(54) METHOD AND APPARATUS FOR REINFORCING A PREFETCH CHAIN

(75) Inventors: Robert N. Cooksey, Hillsboro, OR (US); Stephan J. Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 10/164,345

(22) Filed: Jun. 5, 2002

(65) Prior Publication Data

US 2003/0105940 A1 Jun. 5, 2003

Related U.S. Application Data

(63) Continuation-in-part of application No. 09/999,518, filed on Nov. 30, 2001, now Pat. No. 6,954,840, and a continuation-in-part of application No. 10/000,549, filed on Nov. 30, 2001, now Pat. No. 6,675,280.

(51) Int. Cl.
*G06F 12/00* (2006.01)

(52) U.S. Cl. .................. 711/213; 711/118; 711/137; 711/200; 712/205; 712/207; 712/233; 712/234; 712/237

(58) Field of Classification Search ............... 711/137, 711/118, 200, 213; 712/205, 207, 233, 234, 712/237
See application file for complete search history.

(56) References Cited

U.S. PATENT DOCUMENTS 4,980,823 A   12/1990   Liu
5,317,718 A   5/1994    Jouppi
5,357,618 A   10/1994   Mirza et al.
5,423,014 A   6/1995    Hinton et al.
5,500,948 A   3/1996    Hinton et al.
5,664,147 A   9/1997    Mayfield
5,666,505 A   9/1997    Bailey
5,694,568 A   12/1997   Harrison, III et al.
5,701,448 A   12/1997   White
5,724,422 A   3/1998    Shang et al.
5,740,399 A   4/1998    Mayfield et al.
5,752,037 A   5/1998    Gornish et al.
5,758,119 A   5/1998    Mayfield et al.
5,764,946 A   6/1998    Tran et al.
5,765,214 A   6/1998    Sywyk (Continued)

FOREIGN PATENT DOCUMENTS

EP            1150213 A1     10/2001

OTHER PUBLICATIONS

Kenneth K. Chan et al, "Design of the HP PA 7200 CPU", Hewlett-Packard Journal, Feb. 1996.*

(Continued)

*Primary Examiner*—Stephen C. Elmore
*Assistant Examiner*—Daniel Kim
(74) *Attorney, Agent, or Firm*—Blakely, Sokoloff, Taylor & Zafman LLP

(57) ABSTRACT

A content prefetcher having a prefetch chain reinforcement mechanism. In response to a prefetch hit at a cache line within a prefetch chain, a request depth of the hit cache line is promoted and the hit cache line is scanned for candidate virtual addresses in order to reinforce the prefetch chain.

52 Claims, 19 Drawing Sheets

U.S. PATENT DOCUMENTS

| | | | |
|---|---|---|---|
| 5,778,423 | A | 7/1998 | Sites et al. |
| 5,970,508 | A * | 10/1999 | Howe et al. ............... 711/113 |
| 5,991,848 | A | 11/1999 | Koh |
| 6,012,135 | A | 1/2000 | Leedom et al. |
| 6,055,622 | A | 4/2000 | Spillinger |
| 6,076,151 | A | 6/2000 | Meier |
| 6,079,005 | A | 6/2000 | Witt et al. |
| 6,081,479 | A | 6/2000 | Ji et al. |
| 6,085,291 | A | 7/2000 | Hicks et al. |
| 6,092,186 | A | 7/2000 | Betker et al. |
| 6,098,154 | A | 8/2000 | Lopez-Aguado et al. |
| 6,119,221 | A | 9/2000 | Zaiki et al. |
| 6,131,145 | A | 10/2000 | Matsubara et al. |
| 6,138,212 | A | 10/2000 | Chiacchia et al. |
| 6,161,166 | A | 12/2000 | Doing et al. |
| 6,212,603 | B1 | 4/2001 | McInerney et al. |
| 6,247,107 | B1 * | 6/2001 | Christie ...................... 711/216 |
| 6,275,918 | B1 | 8/2001 | Burky et al. |
| 6,292,871 | B1 | 9/2001 | Fuente |
| 6,295,594 | B1 | 9/2001 | Meier |
| 6,412,046 | B1 * | 6/2002 | Sharma et al. .............. 711/137 |
| 6,594,731 | B1 * | 7/2003 | Hertwig et al. ............. 711/137 |
| 6,622,212 | B1 * | 9/2003 | Tetrick ....................... 711/137 |

OTHER PUBLICATIONS

Cooksey, et al., "Content-Based Prefetching: Initial Results", presented at 2nd workshop on Intelligent Memory Systems (IMS00), Nov. 2000, pp. 1-17.

Boehm, "Hardware and Operating System Support for Conservative Garbage Collection", Xerox PARC, Palo Alto, CA, 1991 IEEE, pp. 61-67.

Roth, et al., "Dependence Based Prefetching for Linked Data Structures", In the proceedings of the 8th International Conference on Architectural support for Programming Languages and Operating Systems, Oct. 1998, pp. 115-126.

Charney, et al., "Generalized Correlation-Based Hardware Prefetching", School of Electrical Engineering, Cornell University, Ithaca, NY, Technical Report No. EE-CEG-95-1, Feb. 13, 1995, pp. 1-45.

Chen, et al., "Reducing Memory Latency Via Non-Blocking and Prefetching Caches", Department of Computer Science and Engineering, University of Washington, Seattle, WA, 1992, pp. 51-61.

Joseph, et al., "Prefetching Using Markov Predictors", IBM T.J. Watson Research, Yorktown Heights, NY, 1997, pp. 252-263.

Jouppi, "Improving Direct-Mapped Cache Performance by the Addition of a Small Fully-Associative Cache and Prefetch Buffers", Digital Equipment Corporation Western Research Lab, Palo Alto, CA, 1990 IEEE, pp. 364-373.

Lipasti, et al., "Spaid: Software Prefetching in Pointer-and Call-Intensive Environments", IBM Corporation, Rochester, MN, 1995 IEEE, pp. 231-236.

Luk, et al., "Compiler-Based Prefetching for Recursive Data Structures", Department of Computer Science, Department of Electrical and Computer Engineering, University of Toronto, Toronto, Canada, 1996, pp. 222-233.

Mowry, et al., "Design and Evaluation of a Compiler Algorithm for Prefetching", Computer Systems Laboratory, Stanford University, CA, 1992, pp. 62-73.

Ozawa, et al., "Cache Miss Heuristics and Preloading Techniques for General-Purpose Programs", Fujitsu Laboratories Ltd., Kawasaki, Japan, 1995 IEEE, pp. 243-248.

Palacharla, et al., "Evaluating Stream Buffers As a Secondary Cache Replacement", Computer Sciences Department, University of Wisconsin, Madison, WI, 1994 IEEE, pp. 24-33.

Yang, et al., "Push Vs. Pull: Data Movement for Linked Data Structures", Department of Computer Science, Duke University, Durham, NC, 2000, pp. 176-186.

Patterson, David A. et al., Computer Architecture A Quantitative Approach, Morgan Kaufmann Publishers, 2nd Edition, 1996.

Tanenbaum, Andrew S., Structured Computer Organization, Prentice Hall, Inc., 4th Edition, 1999.

Vanderwiel, Steven P., et al., Data Prefetch Mechanisms, ACM Computing Surveys, vol. 32, No. 2, Jun. 2000, pp. 174-199.

* cited by examiner

METHOD AND APPARATUS FOR REINFORCING A PREFETCH CHAIN

CLAIM OF PRIORITY

This application is a continuation-in-part of U.S. patent application Ser. No. 09/999,518, now U.S. Pat. No. 6,954,840, entitled "Method and Apparatus for Content-Aware Prefetching", and Ser. No. 10/000,549, now U.S. Pat. No. 6,675,280, entitled "Method and Apparatus for Identifying Candidate Virtual Addresses in a Content-Aware Prefetcher", both of which were filed on Nov. 30, 2001.

FIELD

Embodiments of the invention relate generally to prefetching within the memory hierarchy of a processor and, more particularly, to a method and apparatus for reinforcing a prefetch chain.

BACKGROUND

A conventional processor typically operates at a much faster speed than the main memory to which the processor is coupled. To overcome the inherent latency of main memory, which usually comprises dynamic random access memory (DRAM), a memory hierarchy is employed. The memory hierarchy includes one or more levels of cache, each cache comprising a relatively fast memory device or circuitry configured to hold data recently accessed—or expected to be accessed—by the processor. The purpose of the cache is to insure most data needed by a processor is readily available to the processor without accessing the main memory, as the process of accessing main memory is very slow in comparison to the speed of the processor or the speed at which the processor can access a cache.

Typically, a memory hierarchy comprises multiple levels of cache, wherein each level is faster than next lower level and the level closest to the processor exhibits the highest speed and performance. A cache may be located on the processor itself—i.e., an "on-chip" cache—or a cache may comprise an external memory device—i.e., an "offchip" cache. For example, a processor may include a high level on-chip cache—often times referred to as an "L1" cache—wherein the processor is coupled with a lower level off-chip cache—which is often referred to as an "L2" cache. Alternatively, a processor may include an on-chip L1 cache, as well as an on-chip L2 cache. Of course, a memory hierarchy may include any suitable number of caches, each of the caches located on-chip or off-chip.

As noted above, each level of cache may hold data recently accessed by the processor, such recently accessed data being highly likely—due to the principles of temporal and spatial locality—to be needed by the processor again in the near future. However, system performance may be further enhanced—and memory latency reduced by anticipating the needs of a processor. If data needed by a processor in the near future can be predicted with some degree of accuracy, this data can be fetched in advance—or "prefetched"—such that the data is cached and readily available to the processor. Generally, some type of algorithm is utilized to anticipate the needs of a processor, and the value of any prefetching scheme is dependent upon the degree to which these needs can be accurately predicted.

One conventional type of prefetcher is commonly known as a "stride" prefetcher. A stride prefetcher anticipates the needs of a processor by examining the addresses of data requested by the processor—i.e., a "demand load"—to determine if the requested addresses exhibit a regular pattern. If the processor (or an application executing thereon) is stepping through memory using a constant offset from address to address—i.e., a constant stride—the stride prefetcher attempts to recognize this constant stride and prefetch data according to this recognizable pattern. Stride prefetchers do, however, exhibit a significant drawback. A stride prefetcher does not function well when the address pattern of a series of demand loads is irregular—i.e., there is not a constant stride—such as may occur during dynamic memory allocation.

Another method of data prefetching utilizes a translation look-aside buffer (TLB), which is a cache for virtual-to-physical address translations. According to this method, the "fill contents"—i.e., the requested data—associated with a demand load are examined and, if an address-sized data value matches an address contained in the TLB, the data value likely corresponds to a "pointer load"—i.e., a demand load in which the requested data is an address pointing to a memory location—and is, therefore, deemed to be a candidate address. A prefetch request may then be issued for the candidate address. Because the contents of the requested data—as opposed to addresses thereof—are being examined, this method may be referred to as content-based, or content-aware, prefetching. Such a content-aware prefetching scheme that references the TLB (or, more generally, that references any external source or index of addresses) has a significant limitation: likely addresses are limited to those cached in the TLB, and this constraint significantly reduces the number of prefetch opportunities. Also, this content-aware prefetching scheme requires a large number of accesses to the TLB; thus, additional ports must be added to the TLB to handle the content prefetcher overhead.

DETAILED DESCRIPTION

Figure 1:
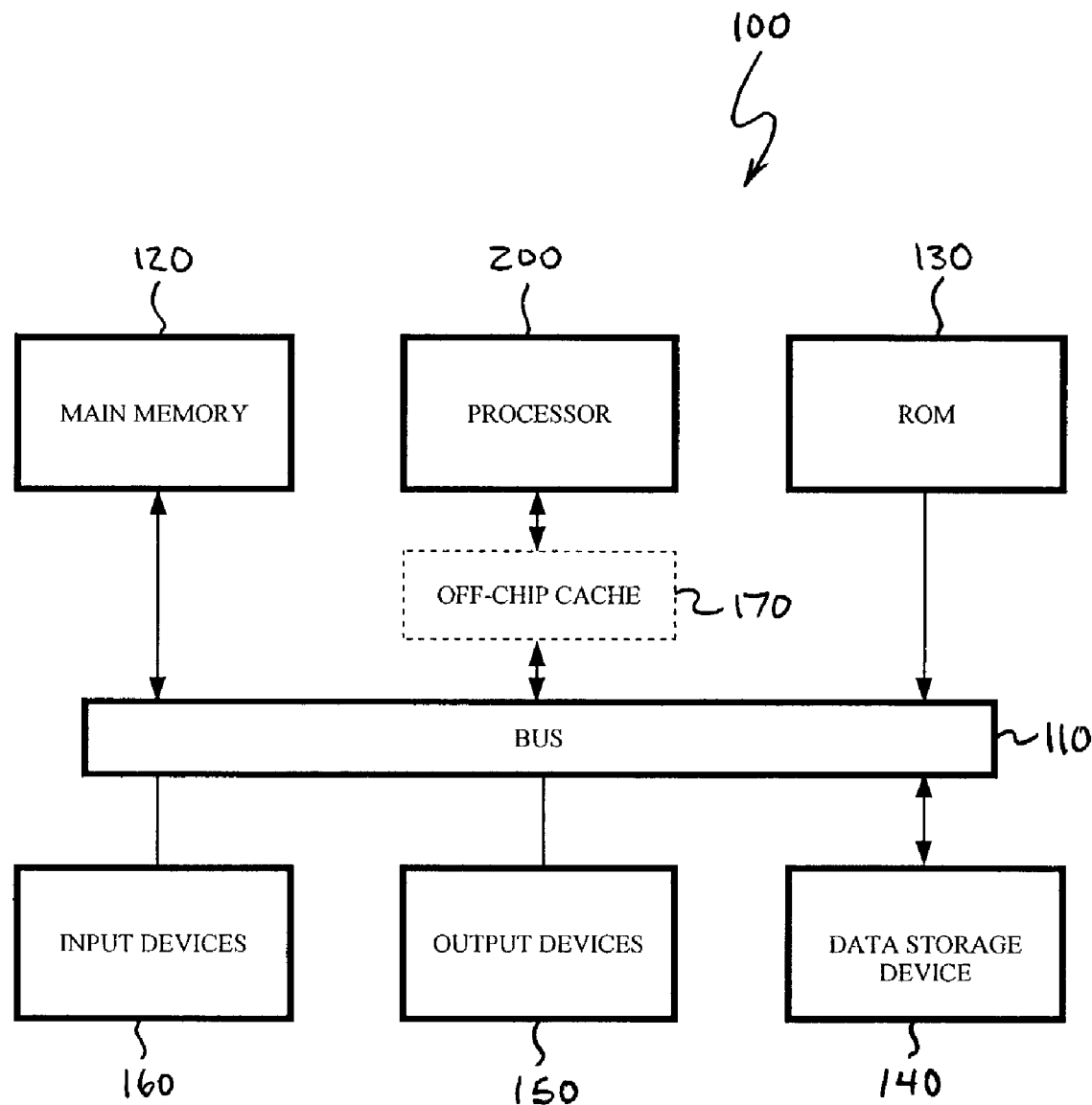
FIG. 1 is a schematic diagram of an exemplary embodiment of a system including a processor having a content prefetcher.

Referring to FIG. 1, a system 100 includes a bus 110 having a processor 200 coupled therewith. The processor 200 may comprise any suitable processing device or circuitry. In one embodiment, as will be discussed below, the processor 200 includes only on-chip cache. However, in an alternative embodiment, the processor 200 may include off-chip cache 170—which may be provided alone or in combination with on-chip cache—coupled with the processor 200.

A main memory 120 is coupled with the bus 110, the main memory 120 comprising, for example, dynamic random access memory (DRAM). The main memory 120 may contain data and/or instructions to be used by the processor 200 while executing an application. A read only memory (ROM) 130 may also be coupled with the bus 110. The ROM 130 may store instructions for execution on processor 200. Further, a data storage device 140, such as a hard disk drive or other suitable non-volatile memory, may be coupled with the bus 110.

The system 100 may also include one or more output devices 150 coupled with the bus 110. Common output devices 150 include video monitors, printers, and audio output devices (e.g., a sound card and/or speakers). The system 100 may further include one or more input devices 160 coupled with the bus 110. Typical input devices include keyboards, pointing devices such as a mouse, as well as scanners and other data entry devices. It should be understood that the system 100 may include other components in addition to those illustrated in FIG. 1, which have been omitted for clarity, including a removable storage media (e.g., floppy disk drive, CD-ROM drive), a network interface, a chip set coupled with the processor, as well as additional signal lines and busses.

Figure 2:
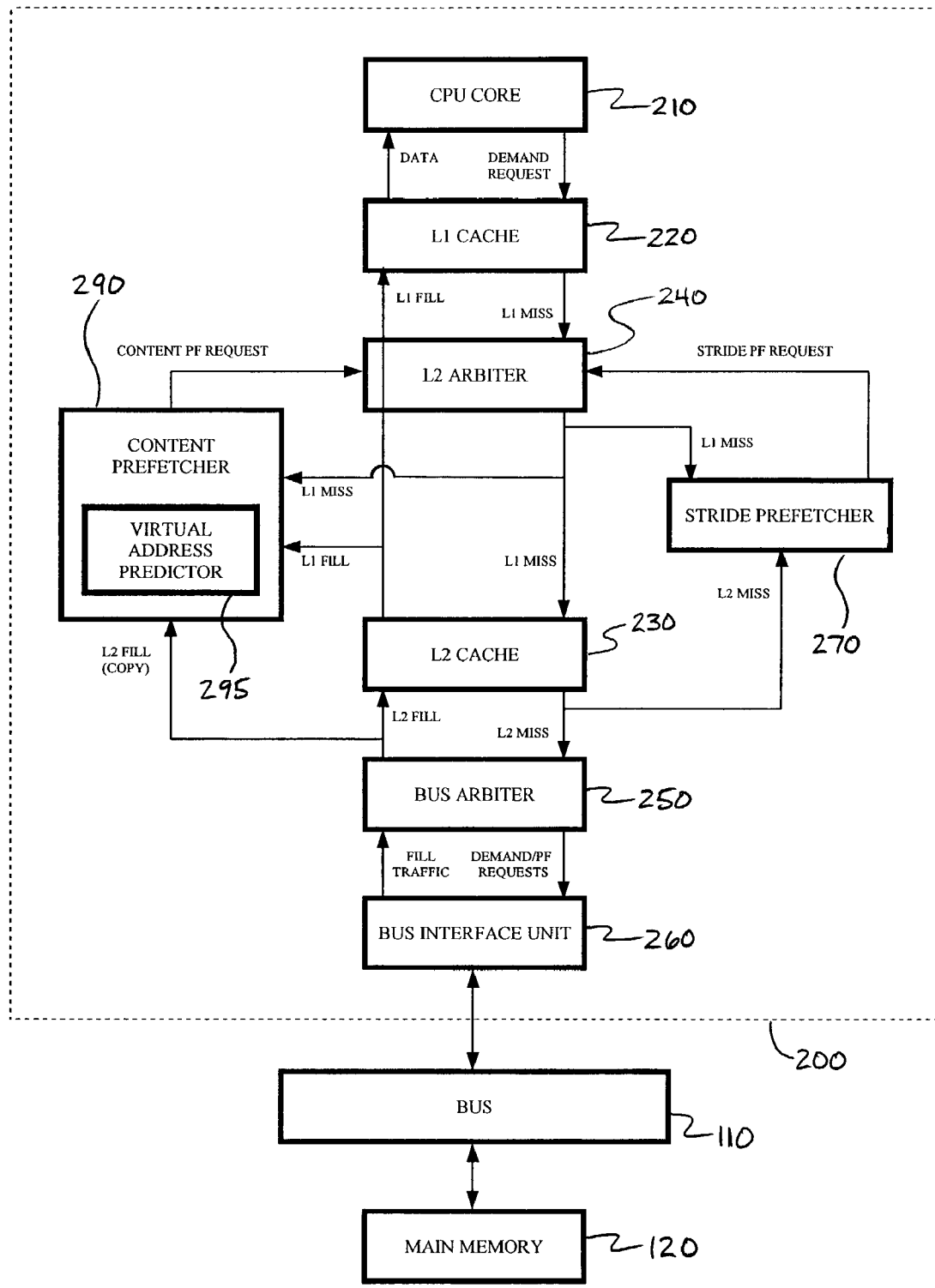
FIG. 2 is a schematic diagram of an exemplary embodiment of a processor including an embodiment of a content prefetcher having a virtual address predictor.

Referring now to FIG. 2, the processor 200 includes a CPU (central processing unit) core 210. Coupled with the CPU core 210 is a first level on-chip cache, or "L1 cache," 220. A second level on-chip cache, or "L2 cache," 230 is also disposed in the processor 200. An arbiter, which will be referred to herein as the "L2 arbiter" 240, is coupled with each of the L1 and L2 caches 220, 230. Another arbiter, which will be referred to herein as the "bus arbiter" 250, is coupled with the L2 cache. The bus arbiter 250 is also coupled with a bus interface unit 260. The bus interface unit 260 couples the processor 200 with bus 110, thereby enabling communication between processor 200 and main memory 120. The L1 and L2 caches 220, 230 may each comprise any suitable type of memory or circuitry.

The L1 cache 220 and L2 cache 230, in conjunction with main memory 120, provide a memory hierarchy for CPU core 210. Generally, the L1 cache 220 exhibits the highest speed relative to the CPU core 210, whereas the main memory 120 exhibits the lowest relative speed. The L2 cache 230 operates much faster than the main memory 120, but may be slower than L1 cache 220. The data storage device 140 (see FIG. 1) may also be considered a part of the memory hierarchy, the data storage device 140 being the slowest element in the hierarchy. Each of the L1 and L2 caches 220, 230 store data and/or instructions recently accessed, or expected to be accessed, by CPU core 210.

During operation, if the CPU core 210 request data—i.e., a "demand load" or a "demand request"—the L1 cache 220 is accessed to determine whether it contains the requested data and, if so, the data is provided to the CPU core 210. If the L1 cache 220 does not contain the requested data—i.e., a "cache miss"—the demand request is passed to the L2 arbiter 240. The L2 arbiter 240 then provides the demand request to the L2 cache 230, and the L2 cache 230 is accessed to determine whether it contains the requested data. If the L2 cache 230 contains the requested data, the requested data—i.e., the "fill content"—is forwarded to the L1 cache 220 and on to the CPU core 210. If the demand load is not met by the L2 cache 230, the load is passed to the bus arbiter 250. The bus arbiter 250 will transmit the demand request off-chip to main memory 120. If the main memory 120 holds the requested data, the fill content is passed up the memory hierarchy to the CPU core 210. If the main memory 120 can not satisfy the demand request, data storage device 140 may be accessed. Each of the L2 and bus arbiters 240, 250 includes a buffer memory, and the L2 and bus arbiters 240, 250 may buffer a demand request if multiple loads are in progress. During memory request arbitration, the L2 and bus arbiters 240, 250 may also buffer prefetch requests, as will be explained below.

A process executing in CPU core 210 may access a virtual address space. Typically, such a virtual address space is maintained by a memory management unit, or MMU (not shown in figures). To access virtually addressed data, the virtual address (or addresses) must be mapped to a physical address—i.e., an actual location in main memory 120. Thus, it should be understood that, as data traverses the memory hierarchy, the data may undergo a virtual-to-physical address translation. For example, the L1 cache 220 may be virtually indexed and the L2 cache 230 physically indexed; therefore, if there is a cache miss at L1 cache 220, a virtual-to-physical address translation is required before accessing the L2 cache 230.

As suggested above, system performance can be enhanced by anticipating the needs of CPU core 210 and prefetching any data that is likely to be imminently requested by the CPU core 210. The processor 200 may include a stride prefetcher 270 coupled with the L2 arbiter 240 and L2 cache 230. The stride prefetcher 270 monitors the L1 miss traffic—i.e., demand loads that have missed at L1 cache 220—as well as the L2 miss traffic—i.e., demand loads that have missed at L2 cache 230—and attempts to detect a constant stride in the requested addresses. If a constant stride is detected, prefetch (PF) requests are provided to the L2 arbiter 240 based upon the detected stride. However, as suggested above, the stride prefetcher 270 does not function adequately when the address pattern of successive demand requests is irregular and there is not a constant stride (e.g., which may occur during dynamic memory allocation).

The processor 200 also includes a novel content prefetcher 290. The content prefetcher 290 is coupled with the L2 cache 230 and receives a copy of all fill content directed to L2 cache 230, the fill content including one or more cache lines. More generally, however, the content prefetcher 290 may be coupled with any level in the memory hierarchy of a processor and receives a copy of all fill content directed thereto. Further, although the content prefetcher 290 of processor 200 is coupled with an on-chip L2 cache 230, it should be understood that the content prefetcher 290 may also be coupled with an off-chip cache, such as the off-chip cache 170 illustrated in FIG. 1. The content prefetcher 290 is also coupled with the L2 arbiter 240.

The content prefetcher 290 includes a virtual address predictor 295. As previously described, the content prefetcher 290 receives a copy of each cache line received at L2 cache 230. The virtual address predictor 295 examines a cache line and differentiates candidate virtual addresses from other data values and random bit patterns contained in the cache line without reference to any external address source—i.e., a TLB—which may unnecessarily constrain the range of potential addresses and, hence, the potential prefetch opportunities. The virtual address predictor 295 comprises any suitable circuitry and/or instructions capable of identifying candidate virtual addresses in a cache line based upon the data contained in the cache line itself, without accessing an external address reference.

Figure 3:
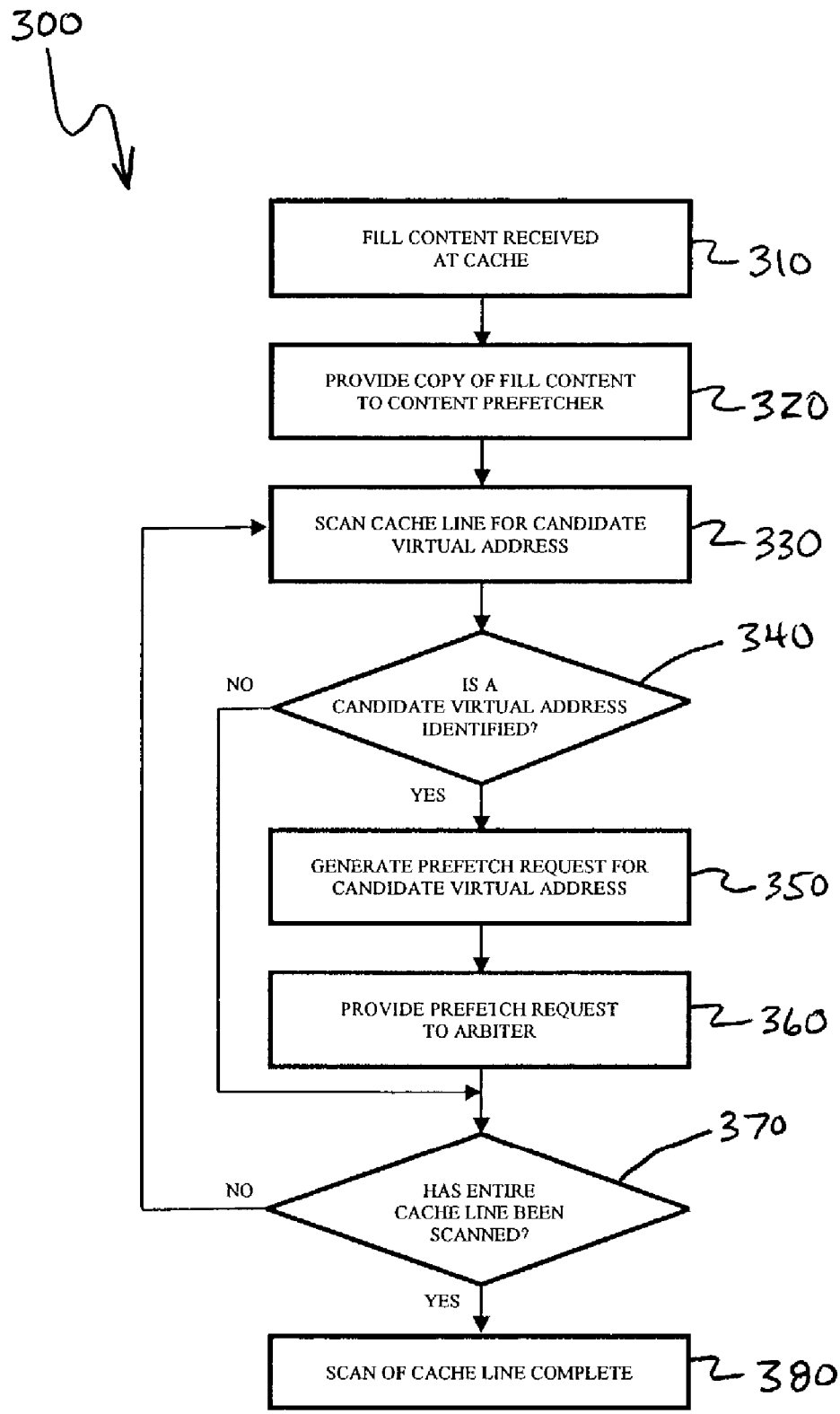
FIG. 3 is a flow chart illustrating an embodiment of a method of content-aware prefetching.

Operation of the content prefetcher 290 and virtual address predictor 295 may be better understood with reference to a method 300 of content-aware prefetching shown in FIG. 3. Referring to reference numeral 310 in FIG. 3, fill content is received at L2 cache 230. A copy of the fill content is provided to the content prefetcher 290, as denoted at 320. The fill content includes a cache line (or, alternatively, the fill content includes two or more cache lines). As shown at reference numeral 330, the cache line is scanned for candidate virtual addresses. If a candidate virtual address is identified by virtual address predictor 295—see reference numeral 340—the content prefetcher 290 generates a prefetch request corresponding to the identified candidate virtual address, as illustrated by reference numeral 350. The content prefetcher 290 then provides a the prefetch request to the L2 arbiter 240—see reference numeral 360—which may buffer and/or issue to main memory 120 a prefetch request based upon memory request arbitration, as will be described below.

The above-described process is continued until the entire cache line has been scanned. When the entire cache line has been scanned—see reference numeral 370—and all candidate virtual addresses contained in the cache line identified, the scan of the cache line is complete, as shown at 380. As will be described in greater detail below, the entire cache line—or a portion thereof—may be scanned in parallel.

As described above, a copy of all fill content directed to the L2 cache 230 is provided to the content prefetcher 290. Thus, for each demand request issued by the CPU core 210 resulting in a cache miss at L2 cache 230—or, more generally, resulting in a cache miss at the level of cache with which the content prefetcher 290 is coupled—the content prefetcher 290 will receive a copy of the requested data. The fill contents associated with demand requests that have missed at some level of cache in the memory hierarchy may be referred to as the "demand reference stream." However, other fill content will be directed to the L2 cache 230 as a result of prefetch requests issued by the L2 arbiter 240 (or bus arbiter 250)—i.e., the "prefetch reference stream"—and a copy of fill content associated with the prefetch reference stream is also provided to the content prefetcher 290. Thus, by examining fill content associated with the demand reference stream as well as that fill content associated with the prefetch reference stream, the content prefetcher 290 includes a recurrence component and may provide prefetch requests based upon prior prefetch requests. Such a recurrence component allows the content prefetcher 290 to follow a recursive path within a data structure, such as a "linked data structure" (i.e., a data structure in which each element contains a pointer to the next element of the structure). A prefetch request provided by the content prefetcher 290 based upon a prior prefetch request may be referred to as a "chained" prefetch request.

When the L2 arbiter 240 receives a prefetch request from the content prefetcher 290—the prefetch request corresponding to a candidate virtual address identified by the virtual address predictor 295—the L2 arbiter 240 may buffer the prefetch request and delay it issuance. Buffering of prefetch requests (as well as, in some instances, demand requests) in the L2 arbiter may be (and, in most instances, is) necessary due to the low bandwidth of bus 110 and the slow access speed of main memory 120. Accordingly, the L2 arbiter 240, as well as the bus arbiter 250, may implement a prioritizing scheme to determine which among multiple prefetch requests, as well as multiple demand requests, contained in its buffer should be issued first. This process of prioritizing memory requests and issuing demand or prefetch requests according to each request's priority may be referred to as memory request arbitration.

Demand requests generally should be accorded the highest priority, as a demand request corresponds to data currently needed by the CPU core 210. Prefetch requests are generally accorded a priority lower than that of demand requests; however, not all prefetch requests in a recursive chain of prefetch requests are as likely to represent data imminently needed by the CPU core 210—i.e., they are more speculative—and, therefore, should be assigned differing priorities. That the content prefetcher 290 provides a recursive component providing a chain of prefetches—the first in the chain based upon the fill content associated with a demand request and each successive prefetch request in the chain based upon the fill content resulting from a previous prefetch—leads to the notion of a "request depth." If a demand request is, for example, assigned a request depth of zero (0), a prefetch request resulting from the fill content associated with a demand request is assigned a request depth of one (1), and each successive chained prefetch is assigned a request depth equal to one (1) more than the prefetch request upon which the chained prefetch request is based.

The above-described request depth provides a measure of confidence in a prefetch request and may be used by the L2 arbiter 240, as well as by the bus arbiter 250, during memory request arbitration to determine the priority of a prefetch request. Memory requests with the lowest request depth may be assigned the highest priority and issued first by the L2 arbiter 240 (or bus arbiter 250). Demand requests have a request depth of, for example, zero and are assigned the highest priority. Prefetch requests resulting from fill content associated with a demand load are assigned the next highest priority. A chained prefetch requests is assigned a priority commensurate with its request depth, the assigned priority inversely proportional to the request depth. Accordingly, chained prefetch requests exhibiting a higher request depth are assigned a lower priority, as they are likely to be more speculative. A chained prefetch request having a request depth greater than a predefined threshold—a threshold at which confidence in the prefetch request is low—are squashed and a prefetch request is not issued by an arbiter. Prefetch requests of the same priority (i.e., the same request depth) are scheduled for issuance by the L2 arbiter 240 (or bus arbiter 250) in a first-come-first-served manner.

Figure 4:
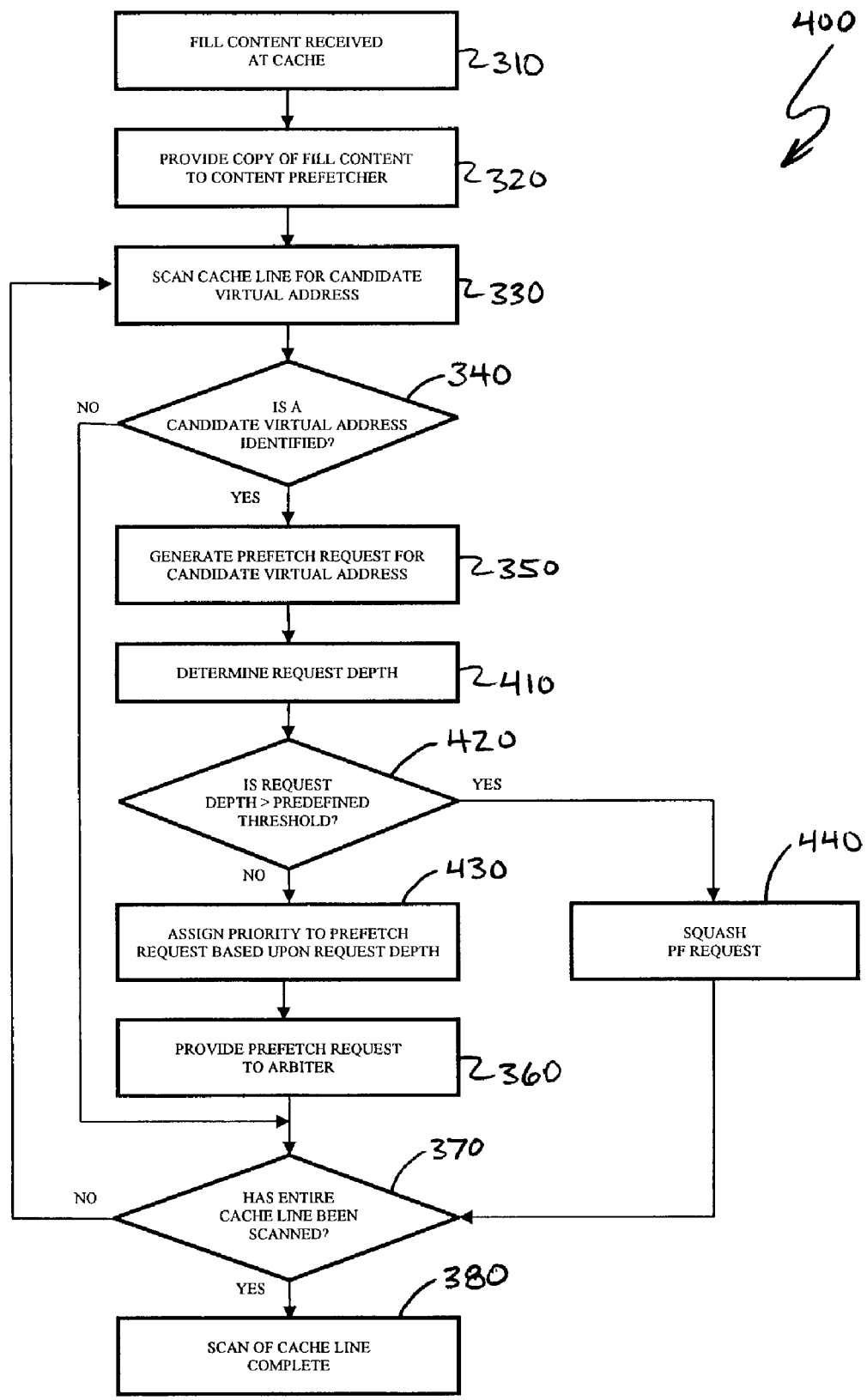
FIG. 4 is a flow chart illustrating another embodiment of the method of content-aware prefetching.

A method 400 of content-aware prefetching and determining a priority of each prefetch request is illustrated in FIG. 4. It should be noted that the method 400 shown in FIG.

4 includes many elements identical to the method 300 of FIG. 3, and like elements retain the same reference numeral in FIG. 4.

Referring to reference numeral 310 in FIG. 4, fill content is received at L2 cache 230, and a copy of the fill content is provided to the content prefetcher 290 (see reference numeral 320). The fill content includes a cache line (or, alternatively, the fill content includes two or more cache lines). The cache line is then scanned for candidate virtual addresses, as denoted at 330. If a candidate virtual address is identified by virtual address predictor 295—see reference numeral 340—the content prefetcher 290 generates a prefetch request for that address, as shown at 350.

Referring now to reference numeral 410 in FIG. 4, the content prefetcher 290 determines a request depth of the prefetch request, as described above. If the request depth is greater than the predefined threshold—see reference numeral 420—the prefetch request is squashed, as denoted at 440. If the request depth does not exceed the predefined threshold, a priority is assigned to the prefetch—see reference numeral 430 wherein the priority is based upon the request depth, as previously described.

Once a priority is assigned to the prefetch request, the content prefetcher 290 provides the prefetch request to the L2 arbiter 240, as shown at 360. The L2 arbiter 240 enqueues the prefetch request in buffer memory pending memory request arbitration based upon the priority of each prefetch request held in its buffer. Again, demand requests have the highest priority and are issued first by the L2 arbiter 240 (and bus arbiter 250). Prefetch requests, which have a priority lower than demand requests, are issued by the L2 arbiter 240 (or bus arbiter 250) in accordance with their respective priority. Again, the priority of a prefetch request is based upon that prefetch request's request depth. The process is continued until the entire cache line has been scanned and, when the entire cache line has been scanned (see reference numeral 370) and all candidate virtual addresses contained in the cache line identified, the scan of the cache line is complete, as shown at 380.

Figure 5:
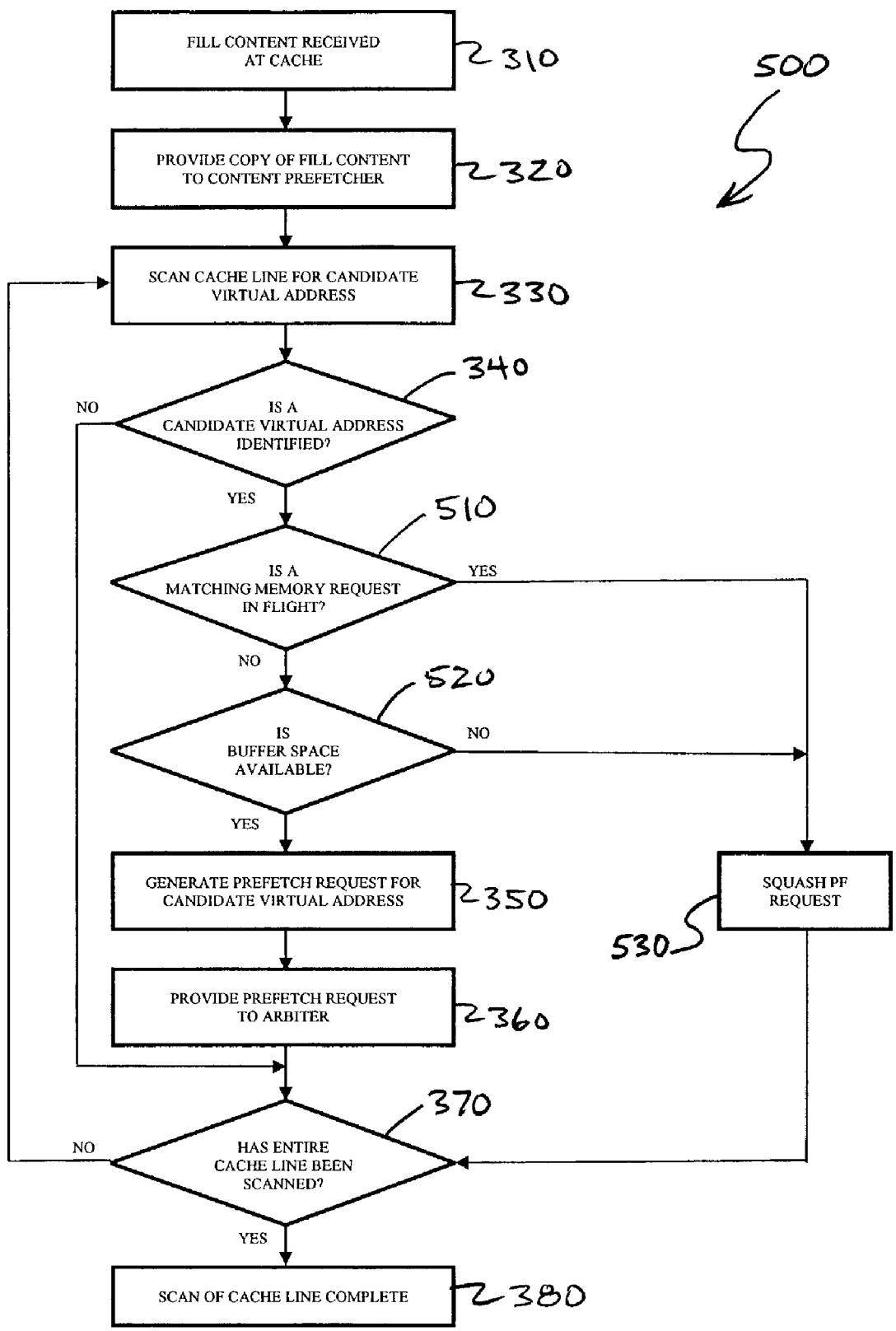
FIG. 5 is a flow chart illustrating a further embodiment of the method of content-aware prefetching.

A further embodiment of a method 500 of content-aware prefetching is illustrated in FIG. 5. It should be noted that the method 500 shown in FIG. 5 includes many elements identical to the method 300 of FIG. 3, and like elements retain the same reference numeral in FIG. 5. Also, the method 500 of content-aware prefetching is similar to the method 300 illustrated in FIG. 3, and a detailed description of those elements previously described is not repeated.

Referring to reference numeral 510, if a candidate virtual address has been identified (see reference numeral 340), both of the L2 and bus arbiters 240, 250 are polled to see if a matching memory request is currently in-flight—i.e., a memory request corresponding to the candidate virtual address has already been issued. If a matching memory request is in-flight, the prefetch request is squashed, as shown at reference numeral 530. In the event a prefetch request is squashed due to an in-flight memory request, scan of the cache line continues (see reference numerals 330, 370).

Prefetch requests are enqueued in a memory buffer of the L2 arbiter 240 (or bus arbiter 250) pending memory request arbitration, as previously described. In some instances, the L2 arbiter's buffer may become full. If no buffer space is available in the L2 arbiter 240—see reference numeral 520—the prefetch request is squashed, as illustrated at reference numeral 530. In the event a prefetch request is squashed due to a lack of available buffer space, the scan of the cache line may continue—see reference numerals 330, 370—as memory space may again become available in the L2 arbiter's buffer.

As set forth above, the virtual address predictor 295 of content prefetcher 290 differentiates—without reference to an external address source, such as a TLB, which may limit the range of prefetch opportunities—candidate virtual addresses from data values and random bit patterns contained within a cache line. A method of identifying candidate virtual addresses, as may be implemented by virtual address predictor 295, is now disclosed. It should be noted that the method of identifying candidate virtual addresses "looks" for virtual addresses—as opposed to physical addresses—because likely addresses contained in fill content directed to the CPU core 210 are in the virtual address space, even though a virtual-to-physical address translation may have taken place within the memory hierarchy.

The method of identifying candidate virtual addresses is based on the premise that if a pointer load—i.e., a demand load in which the requested data is an address pointing to a memory location—is loaded from memory, there is a strong likelihood that the address of the pointer load will be the effective address of a future demand request. Central to this premise is the idea that the base address of a data structure is provided via a pointer load, and any data value within that structure that shares this base address can be interpreted as a pointer to another member of the same data structure. Assuming that all demand requests potentially include pointer loads, any address-sized word contained within a cache line returned in response to a demand request that shares this base address is deemed a candidate virtual address. If a number of upper bits of the address-sized word match the same number of upper bits in the effective address of the cache line, these matching upper bits suggests that the address-sized word and the effective address of the cache line were computed from the same base address and, therefore, the address-sized word likely corresponds to the effective address of a future demand load.

Figure 6:
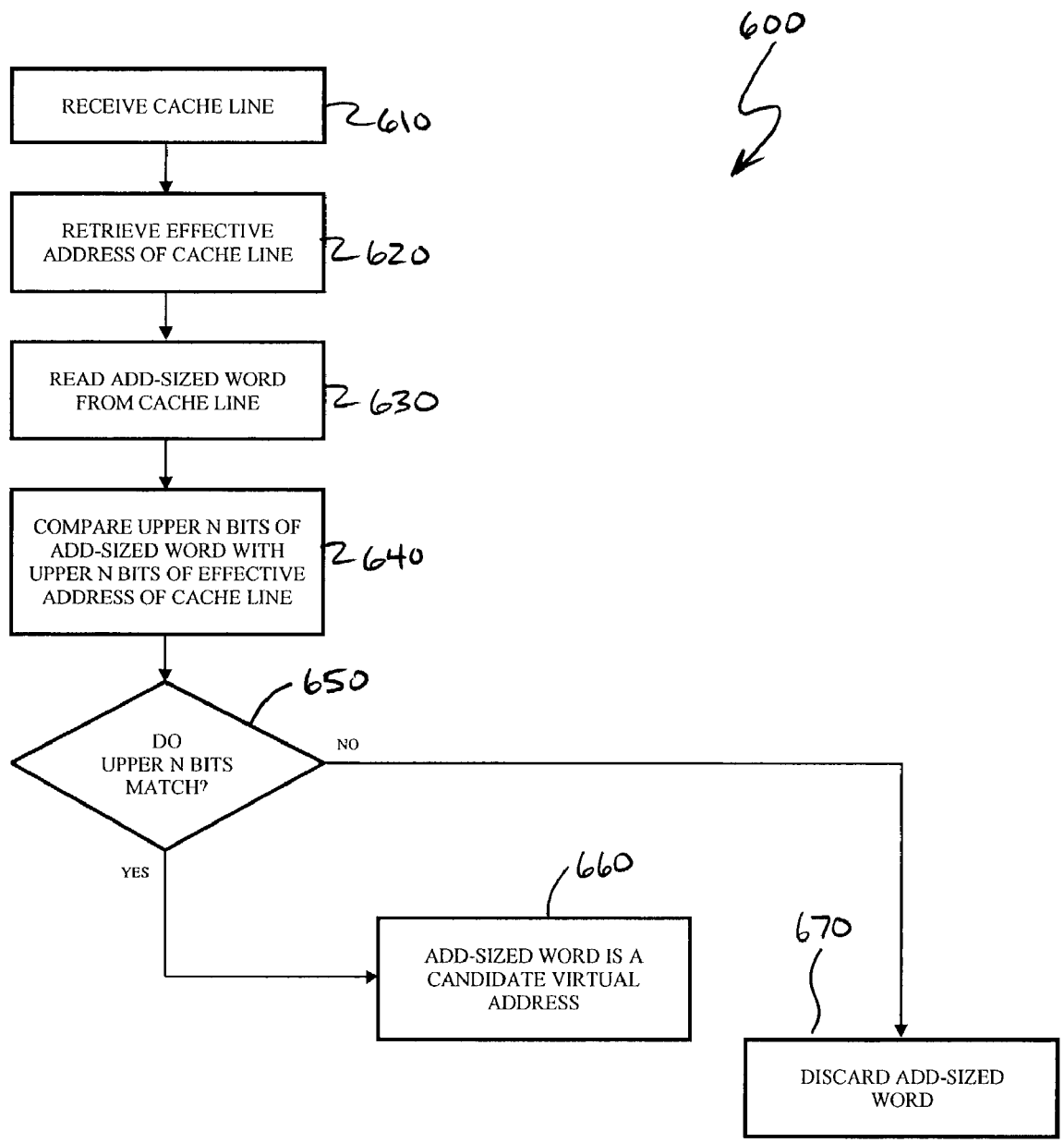
FIG. 6 is a flow chart illustrating an embodiment of a method of identifying candidate virtual addresses.

An exemplary embodiment of a method 600 of identifying candidate virtual addresses is illustrated in FIG. 6. Referring to reference numeral 610, the virtual address predictor 295 receives a cache line. The cache line is included in fill content received at the content prefetcher 290—see FIG. 3, items 310, 320—the fill content received at content prefetcher 290 comprising a copy of fill content directed to L2 cache 230, as noted above. The effective address of the cache line is then retrieved, as denoted by reference numeral 620. The cache line is scanned—see FIG. 3, reference numeral 330—and an address-sized word is read (or otherwise accessed) from the cache line, as illustrated by reference numeral 630. An address-sized word corresponds to thirty-two (32) bits, or four (4) bytes, for a typical processor; however, an address-sized word may be of any suitable length.

Figure 7:
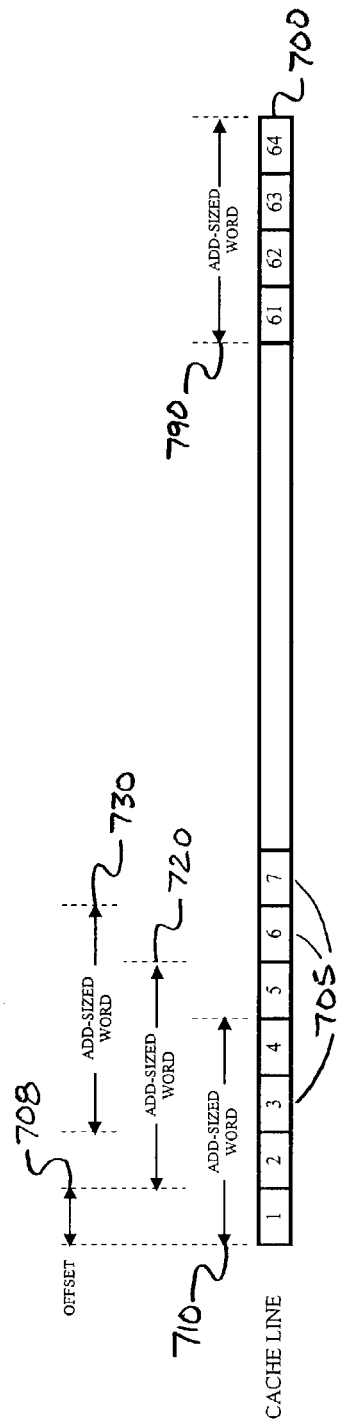
FIGS. 7 through 9 are schematic diagrams, each further illustrating the method shown in FIG. 6.
Figure 8:
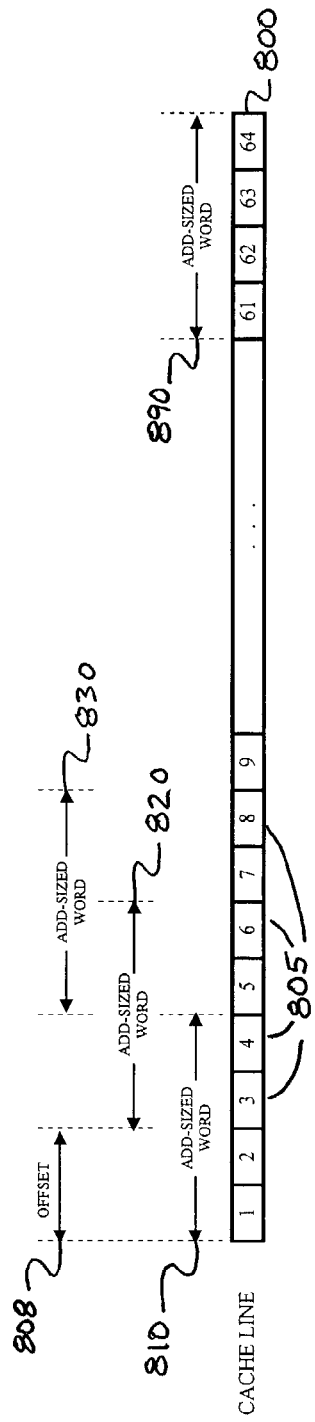
Figure 9:
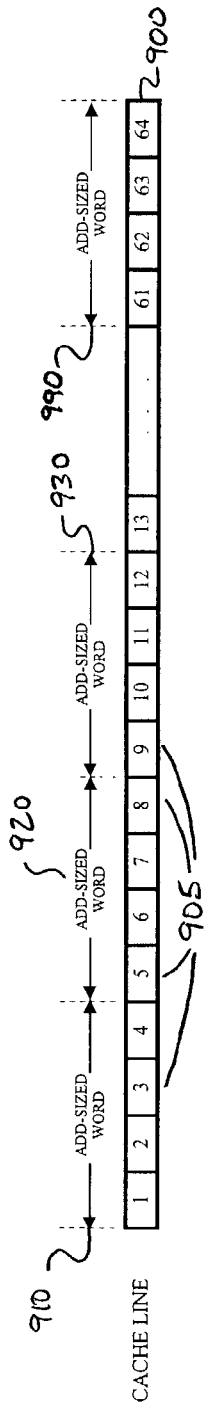

The process of reading an address-sized word (or words) from a cache line is further illustrated in FIGS. 7 through 9. Referring to FIG. 7, an exemplary cache line 700 comprises sixty-four (64) bytes 705. It should be understood, however, that a cache line may be of any suitable length (e.g., 128 bytes). A first address-sized word 710 (i.e., the first four bytes) may be read from the cache line. A second address-sized word 720 may be read from the cache line, wherein the start of the second address-sized word 720 is separated from the start of the first address sized word 710 by an offset 708 of one (1) byte. Similarly, a third address-sized word 730 may be read from the cache line, the third address-sized word 730 and second address-sized word 720 separated by an offset of one (1) byte. Other address-sized words may be read from the cache line in a similar fashion until the final address-sized word 790 is read from the cache line.

The process of scanning a cache line illustrated in FIG. 8 is similar to that illustrated in FIG. 7; however, the offset has been increased and the number of address-sized words read from the cache line decreased. A cache line 800 includes, for example, sixty-four (64) bytes 805. Address-sized words 810, 820, 830, . . . 890 are read from the cache line 800, the start of each address-sized word separated from the preceding address-sized word by an offset 808 of two (2) bytes. Thus, the granularity of the cache line scan can be varied by changing the offset 808, 708, thereby altering the number of address-sized words that will be examined. Also, as suggested above, the cache line 800 (or 700) may be scanned in parallel, wherein the entire cache line is scanned at once. It should be understood, however, that when the amount of data that can be read from the cache line is limited by, for example, bus width, the cache line may be scanned in portions, each portion being scanned in parallel.

Referring to FIG. 9, a cache line 900 comprises sixty-four (64) bytes 905. A first address-sized word 910 is read from the cache line 900, the first address-sized word including the first four bytes of the cache line 900. A second address-sized word 920 is read from the cache line, wherein the start of the second address-sized word 920 corresponds to the end of the first address-sized word 910. Stated another way, the first and second address-sized words 910, 920 are separated by an offset of four (4) bytes, which is also the length of each address-sized word to be read from the cache line 900. A third address-sized word 930 read from the cache line 900 is similarly offset by four bytes from the preceding address-sized word.

A data structure stored in memory wherein each element of the data structure is read starting at a word boundary is said to be "memory aligned" or J-byte aligned. For example, the cache line 900 illustrated in FIG. 9 is "4-byte aligned," whereas the cache line 800 of FIG. 8 is 2-byte aligned. As will be explained below, such memory aligned data exhibits certain characteristics which the virtual address predictor 795 may advantageously utilize during operation.

Figure 10:
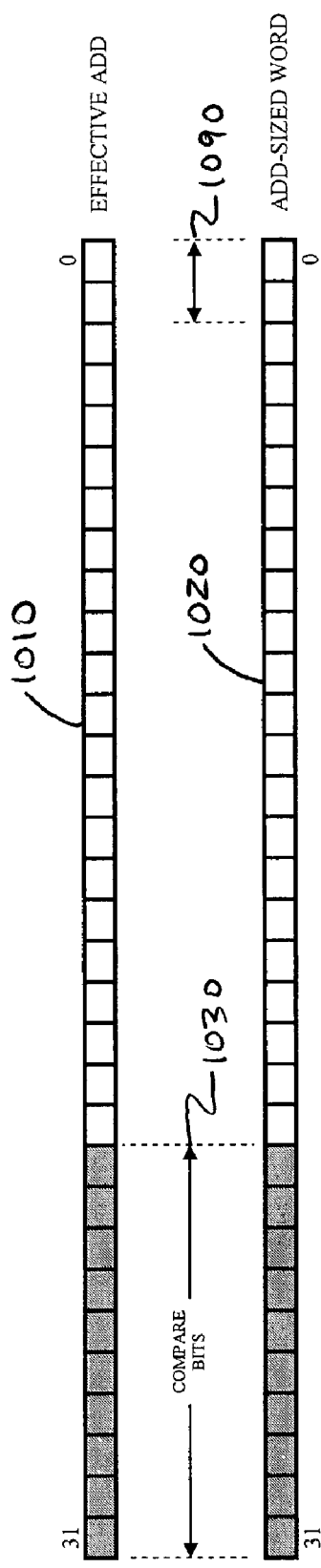
FIG. 10 is a schematic diagram illustrating an embodiment of a process for comparing an address-sized word in a cache line with the cache line's effective address.

Referring again to FIG. 6, once an address-sized word has been read from the cache line, a certain number of the upper bits of the address-sized word are compared against the same number of upper bits in the effective address of the cache line, as denoted at 640. Specifically, an N number of the upper bits of the address-sized word are compared with the upper N bits of the effective address of the cache line. This process is better illustrated with reference to FIG. 10. The upper N bits of the effective address 1010 of a cache line are compared against the upper N bits of an address-sized word 1020 contained in the cache line. The upper N bits of each of the effective address 1010 and the address-sized word 1020, respectively, may be referred to as the compare bits 1030. The upper N bits, or compare bits 1030, may comprise any suitable number of bits. By way of example, for a 32 bit address-sized word, the N compare bits may comprise between 8 and 12 bits.

A bit pattern can be interpreted as a pointer load, a data value, or simply random bits. An address-sized word is deemed to be a pointer to a member of a data structure if the upper N bits thereof match the upper N bits of the effective address of the cache line, which suggests that the address-sized word and the effective address of the cache line were computed from the same base address. If the upper N bits of the address-sized word match the upper N bits of the effective address of the cache line—see reference numeral 650—the address-sized word is identified as a candidate virtual address, as shown at 660, and the content prefetcher 290 may provide a prefetch request for the identified candidate address (see FIGS. 3 through 5). If the upper N bits do not match, the address-sized word is discarded, as illustrated by reference numeral 670. The above-described process—see reference numerals 630, 640, 650, 660, 670—is applied to each address-sized word read from the cache line during the cache line scan.

Figure 11:
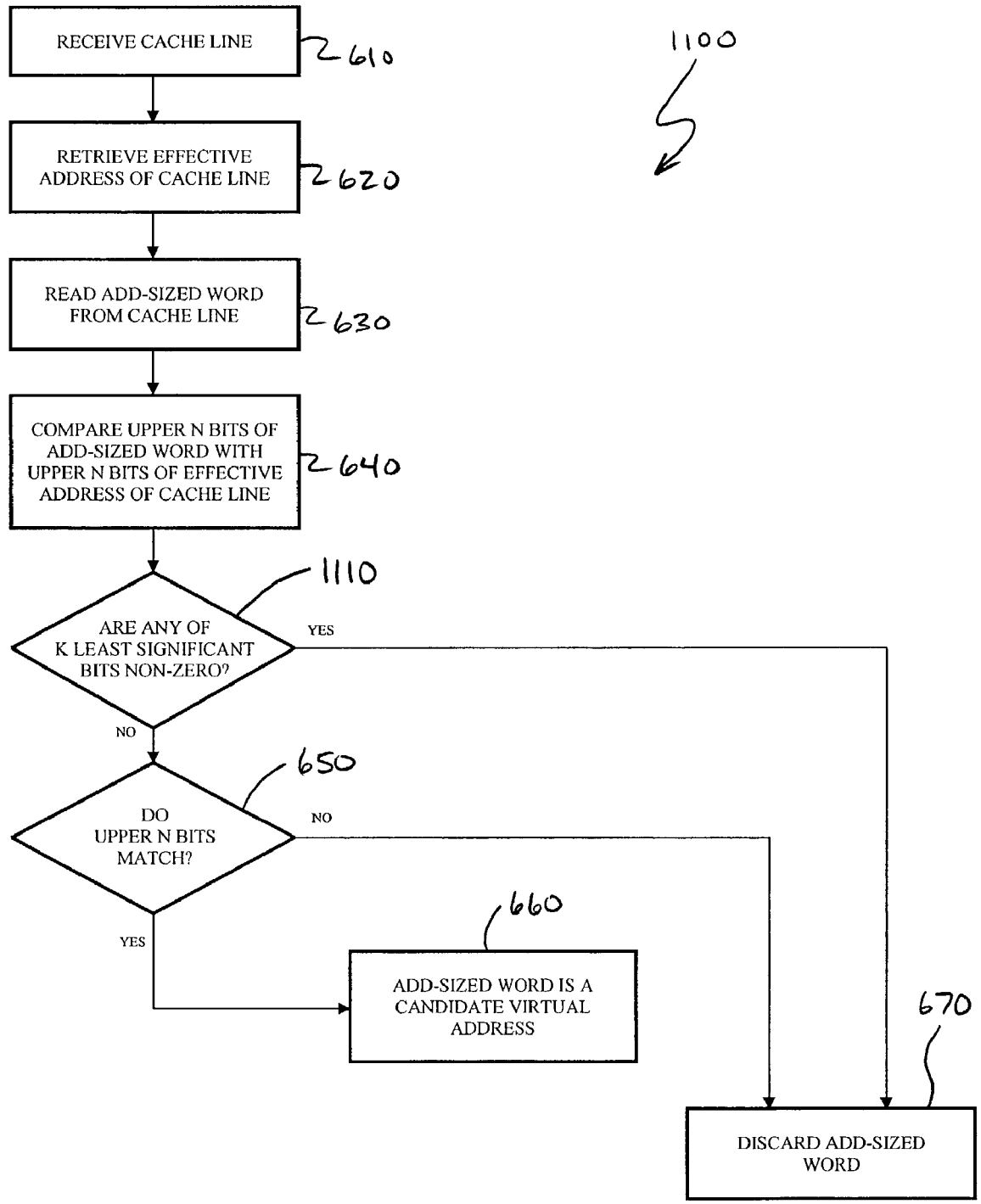
FIG. 11 is a flow chart illustrating another embodiment of the method of identifying candidate virtual addresses.

A further embodiment of the method of identifying candidate virtual addresses is illustrated in FIG. 11. As previously described, a cache line may be memory aligned. For example, a data structure may be 2-byte aligned, 4-byte aligned, 8-byte aligned, 16-byte aligned, or, more generally, J-byte aligned. If the data in a cache line is J-byte aligned, a certain number of the least significant bits (see FIG. 10, reference numeral 1090) of any candidate virtual address will be zero (0). By way of example, for 2-byte aligned data the least significant bit will be zero, for 4-byte aligned data the two least significant bits will be zero, for 8-byte aligned data the three least significant bits will be zero, and for 16-byte aligned data the four least significant bits will be zero. More generally, for J-byte aligned data, the K least significant bits will be zero. The virtual address predictor 295 can use the assumption of memory aligned data to disqualify candidate virtual address. Assuming memory alignment, if any of the K least significant bits of an address-sized word are non-zero, the address-sized word can be disqualified as a candidate virtual address. Referring to FIG. 11, which illustrates a method 1100 substantially similar to the method 600 shown in FIG. 6 (all like elements retaining the same reference numeral), if any of the K least significant bits of the address-sized word read from the cache line are non-zero—see reference numeral 1110—the address-sized word is discarded, as shown at 670.

Figure 12:
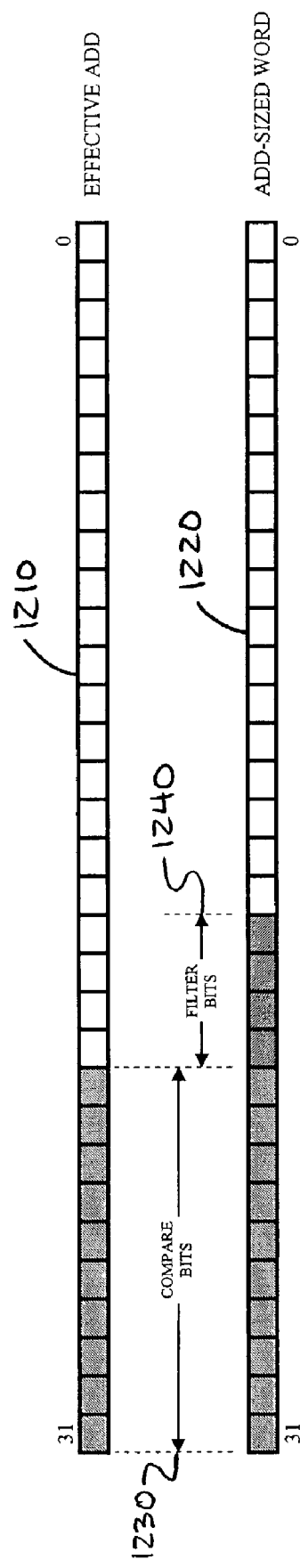
FIG. 12 is a schematic diagram illustrating another embodiment of the process for comparing an address-sized word in a cache line an effective address thereof.

The method 600 (as well as the method 1100) of identifying candidate virtual addresses described above generally functions for any bit pattern contained in the upper bits of the effective address of the cache line, with two exceptions: where the upper N bits are all 0's and where the upper N bits are all 1's (in which case a negative number can potentially be misidentified as a candidate virtual address). However, rather than not predicting when the compare bits of an effective address are all 0's or all 1's, additional filter bits can be used in the comparison to distinguish candidate virtual addresses from data values or random bit patterns. Referring to FIG. 12, the compare bits 1230 of an effective address 1210 of a cache line are either all 1's or all 0's. If the upper N bits of an address-sized word 1220 of the cache line match the upper N bits of the effective address (which are either all 1's or all 0's), additional filter bits 1240 of the address-sized word are examined. The filter bits 1240 comprise the next M bits after the upper N bits or compare bits 1230. If the compare bits 1230 are all 0's and a non-zero bit is found in the filter bit range of an address-sized word, or if the compare bits 1230 are all 1's and a non-one bit is found in the filter bit range of the address-sized word, the address-sized word is deemed a candidate virtual address.

Figure 13:
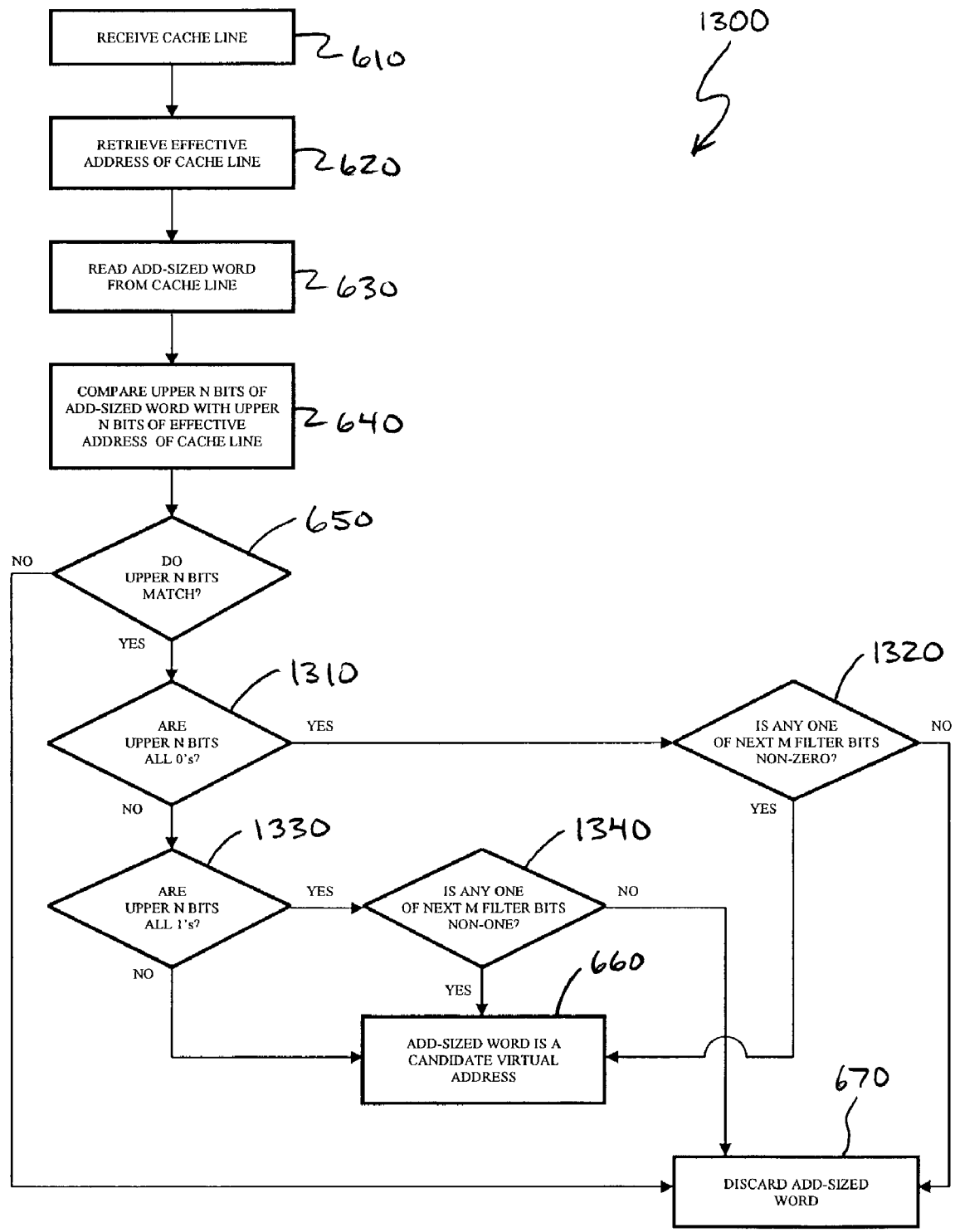
FIG. 13 is a flow chart illustrating a further embodiment of the method of identifying candidate virtual addresses.

A method 1300 of identifying candidate virtual addresses utilizing filter bits is illustrated in FIG. 13. The method 1300 is similar to the method 600 of identifying candidate virtual addresses shown and described with respect to FIG. 6, and like elements retain the same reference numeral. As shown at reference numeral 610, the virtual address predictor 295 receives a cache line. Again, the cache line is included in a copy of fill content received at the content prefetcher 290. The effective address of the cache line is then retrieved, as shown at reference numeral 620. The cache line is scanned and an address-sized word is read (or otherwise accessed) from the cache line, as denoted by reference numeral 630. Referring to reference numeral 640, the upper N bits of the address-sized word are then compared with the upper N bits of the effective address.

If the compare bits of the address-sized word and effective address of the cache line match—see reference numeral 650—and the upper N bits of the effective address are all 0's—see reference numeral 1310—the next M filter bits of the address-size word are examined. Referring to reference numeral 1320, if any one of the next M filter bits of the address-sized word is a non-zero bit, the address-sized word is a candidate virtual address (see reference numeral 660). If a non-zero bit is not found in the filter bit range, the address-sized word is discarded, as shown at 670. Similarly, if the compare bits of the address-sized word and effective address match—see reference numeral 650—and the upper N bits of the effective address are all 1's—see reference numeral 1330—the next M filter bits of the address-sized word are examined. As illustrated at reference numeral 1340, if any one of the next M filter bits of the address-sized word is a non-one bit, the address-sized word is a candidate virtual address (see reference numeral 660). If a non-one bit is not found in the filter bit range, the address-sized word is discarded, as denoted at 670.

The filter bit range may comprise any suitable number of bits. By way of example, for a 32-bit address-sized word, a filter bit range of between 1 and 4 bits is believed suitable. Employing no filter bits would result in no virtual address prediction when the compare bits of the effective address of a cache line are all 0's or all 1's, whereas increasing the number of filter bits relaxes the requirements for potential candidate virtual addresses.

As described above, if a prefetch request has a request depth that exceeds a predefined threshold request depth, the prefetch request is squashed. Stated another way, if a prefetch request has a request depth that equals the threshold request depth, the fill content associated with that prefetch request is not scanned and, accordingly, any candidate virtual addresses in that fill content would not be identified. Thus, no subsequent prefetch requests (having a request depth greater than the threshold) will be generated from fill content associated with a prefetch request having a threshold request depth. This is shown schematically in FIG. 14, which depicts an instance 1400 of the memory hierarchy.

Figure 14:
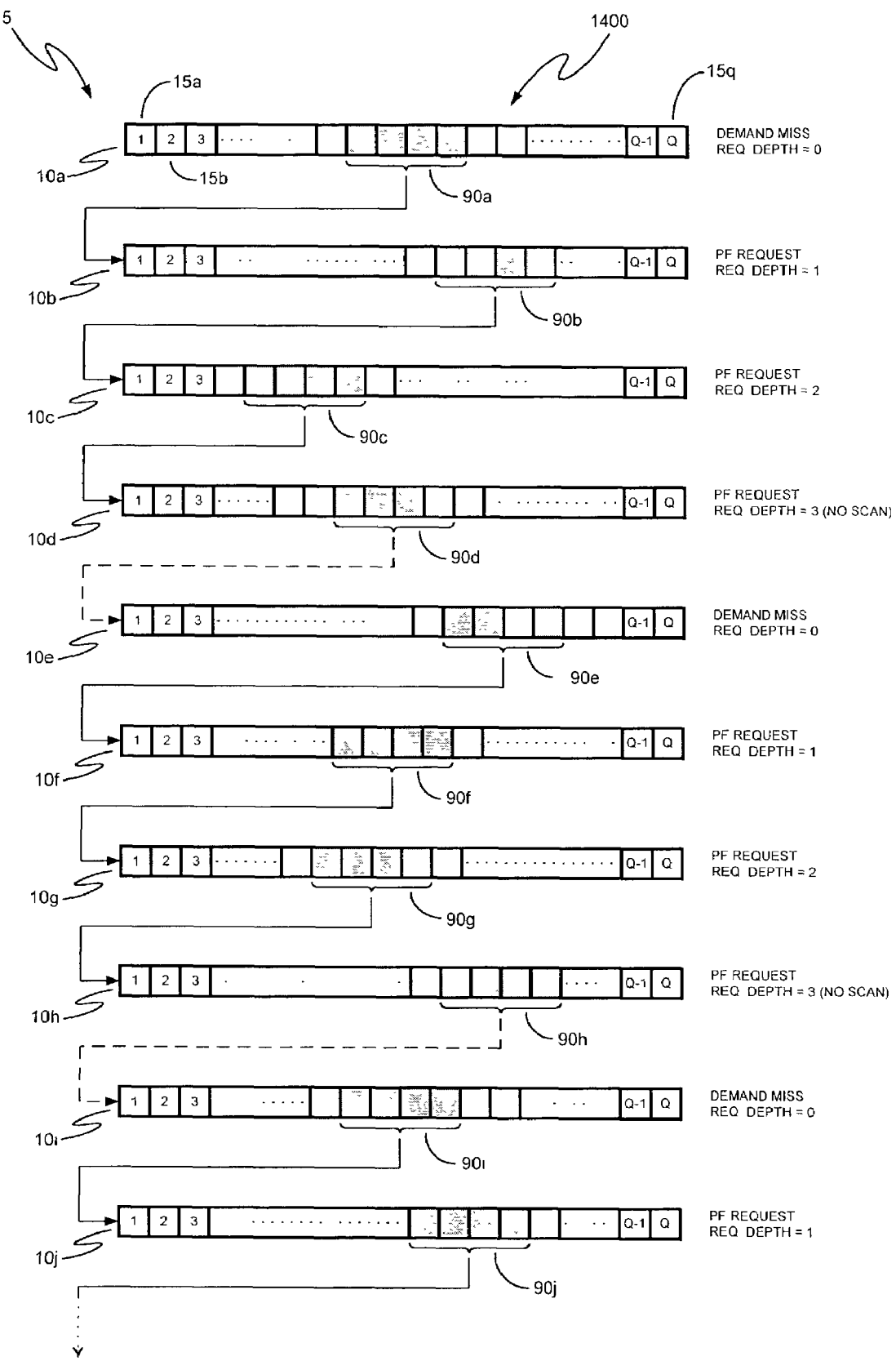
FIG. 14 shows a schematic diagram illustrating a linked data structure with no reinforcement of prefetch chains.

Referring to FIG. 14, a first cache line 10*a* has been retrieved from main memory 120—or other element of the memory hierarchy—in response to a demand request for data not in cache (i.e., a cache miss). A demand request accompanied by a subsequent cache miss will be referred to herein as a "demand miss." Because the cache line 10*a* is associated with a demand miss (i.e., a failed demand for data specifically requested by CPU core 210), the cache line 10*a* has a request depth of zero (0). This request depth is stored with the cache line 10*a*, the request depth typically being stored in a number of status bits associated with the cache line. The cache line 10*a* includes a number of bytes of data. For example, the cache line 10*a* may comprise Q bytes of data, including bytes 15*a*, 15*b*, . . . , 15*q*. A typical length for a cache line is 64 bytes; however, the cache line 10*a* (as well as cache lines 10*b* through 10*j*) may be of any suitable length.

In the example of FIG. 14, the threshold request depth is three (3). The cache line 10*a* does not exceed this threshold request depth and, accordingly, the content prefetcher 290 scans the cache line 10*a* for candidate virtual addresses (see FIGS. 3 through 5). A candidate virtual address 90*a* is identified by content prefetcher 290. The candidate virtual address 90*a* identifies another cache line 10*b*, and a prefetch request is issued for this cache line. For ease of understanding, only a single candidate virtual address is shown in cache line 10*a* (as well as cache lines 10*b* through 10*j*); however, it should be understood that a cache line may have multiple candidate virtual address.

Cache line 10*b* was prefetched based upon a scan of fill content associated with the demand reference stream; therefore, the cache line 10*b* has a request depth of one (1). As the request depth of cache line 10*b* is less than the threshold request depth (i.e., three), a scan of cache line 10*b* is performed by content prefetcher 290 and a candidate virtual address 90*b* identified. The candidate virtual address 90*b* points to a cache line 10*c*, which is then prefetched. The cache line 10*c* has a request depth of two (2), since cache line 10*c* was prefetched based upon a scan of a prior prefetched cache line having a request depth of one (1). Because the request depth of cache line 10*c* is less than the threshold request depth, the cache line 10*c* is scanned for candidate virtual addresses.

Based upon the virtual address scan, cache line 10*c* is shown to include a candidate virtual address 90*c*, which address points to a cache line 10*d* that is then prefetched. The cache line 10*d*, as well as cache lines 10*b* and 10*c*, each include Q-bytes of data (i.e., bytes 15*a*, 15*b*, . . . , 15*q*). Cache line 10*d*, which was prefetched based upon the scan of a cache line having a request depth of two (2), has a request depth of three (3). Thus, the cache line 10*d* has a request depth equal to the threshold request depth, and cache line 10*d* is not scanned for candidate virtual addresses. The chain of prefetches, or "prefetch chain," that includes caches lines 10*a*-*d* is, therefore, terminated.

The cache lines 10*a* through 10*d* may form part of a linked data structure 5. As illustrated by the instance 1400 of the memory hierarchy shown in FIG. 14, the linked data structure 5 may have other members, including, for example, members 10*e*, 10*f*, 10*g*, 10*h*, 10*i*, and 10*j*, as well as other members, each of these members also having Q-bytes of data. The members 10*e* through 10*j* of data structure 5 may also include data needed by the CPU core 210; however, because the prefetch chain of the data structure 5 was terminated, the data contained in cache lines 10*e*-*j* will not be fetched, absent a demand miss (or misses). Note that cache line 10*d* includes a candidate virtual address 90*d* that points to the next member of the data structure 5 (i.e., cache line 10*e*), but cache line 10*d* was not scanned for virtual address because the threshold request depth was reached. Thus, the prefetch chain on linked data structure 5 could be said to have "prematurely terminated," and the premature termination of a prefetch chain can result in missed prefetch opportunities.

As previously suggested, an additional demand miss or misses will need to occur in order to prefetch all members (10*a*-*j*) of the data structure 5. For example, as illustrated by the instance 1400 of the memory hierarchy shown in FIG. 14, a demand miss may occur for cache line 10*e*, causing cache line 10*e* (request depth equal to zero) to be loaded from memory and scanned for candidate virtual addresses. Cache line 10*e* contains a candidate virtual address 90*e*. The candidate virtual address 90*e* points to cache line 10*f*— another member of data structure 5—and cache line 10*f* is prefetched and subsequently scanned for candidate virtual addresses. Cache line 10*f* (request depth equal to one) also includes a candidate virtual address 90*f* that identifies a cache line 10*g*, which is another member of the linked data structure 5. Cache line 10*g* (request depth equal to two) is prefetched and scanned for candidate virtual addresses, and a candidate virtual address 90*g* is found. Virtual address 90*g* points to a cache line 10*h* (request depth equal to three), but cache line 10*h* has a request depth that equals the threshold request depth. Thus, the cache line 10*h* is not scanned for candidate virtual addresses and the prefetch chain on linked data structure 5 is again terminated.

The cache line 10*h* includes a candidate virtual address 90*h* that identifies another member of the data structure 5—i.e., cache line 10*i*—but cache line 10*h* has a request depth (i.e., three) equal to the threshold request depth and, therefore, was not scanned. To continue traversing the linked data structure 5—i.e., to prefetch other members of the data structure 5 that may be needed by CPU core 210—another demand miss (or misses) would have to occur. For example, a demand miss at cache line 10*i* would cause cache line 10*i* (having a request depth of zero) to be loaded from main memory 120 (or other element of the memory hierarchy) and scanned for candidate virtual addresses. Cache line 10*i* includes a candidate virtual address 90*i*, which address identifies a cache line 90*j*. A prefetch request may be issued for cache line 90*j*, which is then loaded from memory and scanned for candidate virtual addresses. Cache line 90*j* (request depth equal to one) contains a candidate virtual address 90*j*, which will lead to a subsequent prefetch request, thereby continuing the prefetch chain of data structure 5.

Although, for the instance 1400 of the memory hierarchy shown in FIG. 14, all members of the linked data structure 5 were prefetched or otherwise retrieved from main memory 120 (or other element of the memory hierarchy), the prefetch chain was twice terminated and two demand misses were incurred to retrieve members 10*a-j* of the data structure 5. When a demand miss occurs, processor latency is incurred as the CPU core 210 is "waiting" for any data that is the subject of a demand request. Thus, repetitively terminating the prefetch chain for a linked data structure leads to missed prefetch opportunities and, accordingly, to a higher rate of demand misses and a corresponding decrease in processor efficiency.

Rather than incur demand misses and, hence, processing latency in order to retrieve all members of a linked data structure that may include data needed, or likely to be needed, by the CPU core 210, it would be desirable to perpetuate, or reinforce, a prefetch chain without incurring a demand miss. Reinforcing a prefetch chain would enable continued traversal of a prefetch chain—a prefetch chain that may have been prematurely terminated—if the chain represents data needed by the CPU core 210. Conversely, if a prefetch chain is unlikely to lead to additional data needed by CPU core 210—i.e., the data is speculative—the greatest efficiency would be achieved by allowing the prefetch chain to terminate without reinforcement. Stated another way, it is desirable to perpetuate "good" prefetch chains—i.e., those having data likely to be needed by CPU core 210—while allowing "bad" prefetch chains—i.e., those having highly speculative data—to terminate (at the threshold request depth) with no reinforcement.

Reinforcement is based on the premise that, while no explicit storing is provided for a prefetch chain, the prefetch chain itself is implicitly stored in cache memory (e.g., L1 cache 220 and/or L2 cache 230). Thus, any demand request that hits on a prefetched cache line—i.e., a "prefetch hit"—will provide the content prefetcher 290 with the necessary feedback to perpetuate a prefetch chain. The request depth value assigned to a prefetched cache line is not fixed for the "life" of the prefetched cache line in memory. If a prefetched cache line is the object of a prefetch hit, that cache line's request depth may be updated to reflect this demand reference to the cache line. Such a reinforcement mechanism—wherein a cache line's request depth may be continually updated or "promoted" in response to a demand reference to that cache line—provides for the perpetuation of a prefetch chain. For example, applying this reinforcement mechanism, a terminated prefetched chain can be re-established.

Figure 15:
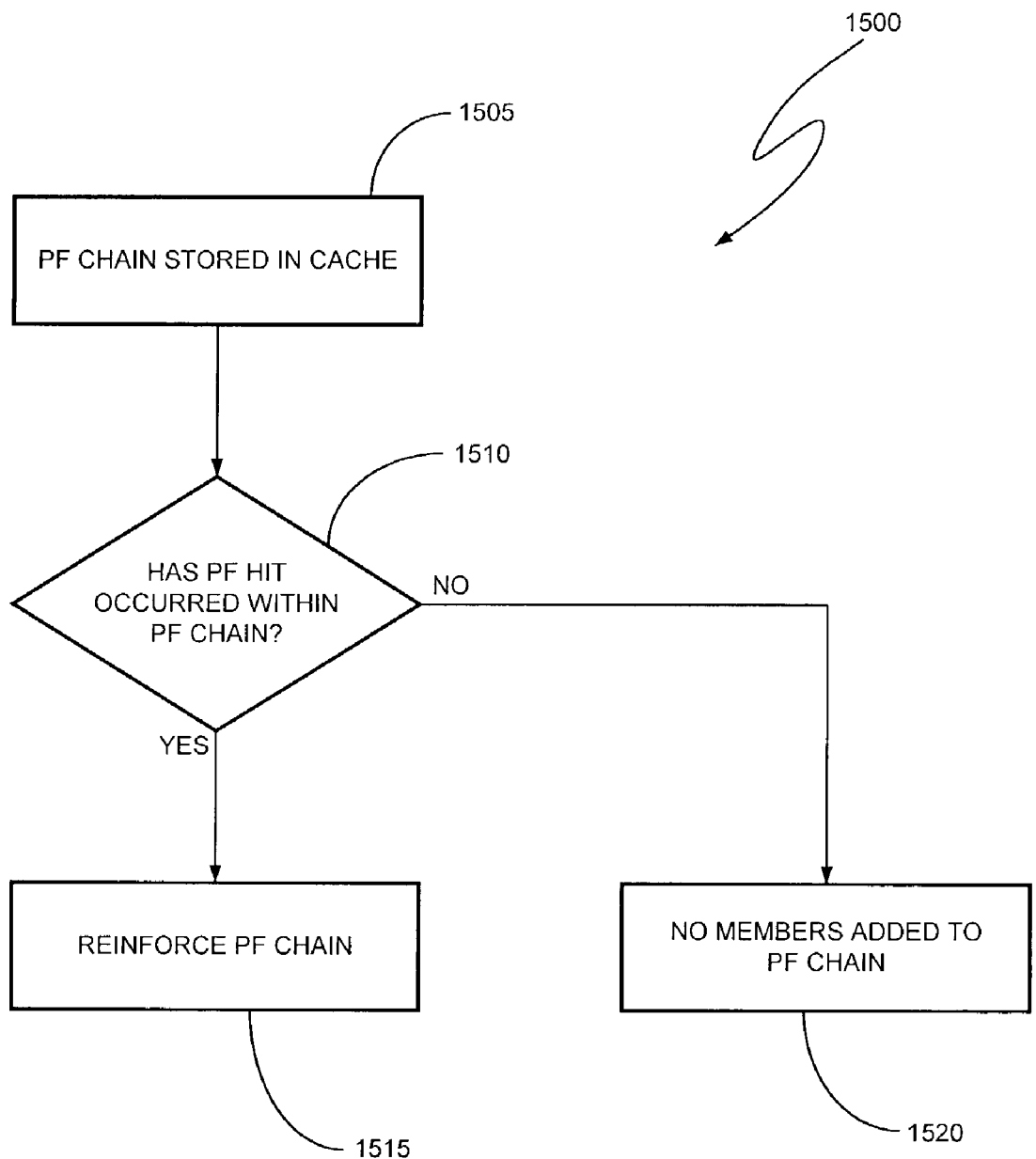
FIG. 15 is a flow chart illustrating an embodiment of a method of reinforcing a prefetch chain.

Referring to FIG. 15, an embodiment 1500 of a method of reinforcing a prefetch chain is illustrated. Referring to block 1505, a prefetch (PF) chain is stored in cache (e.g., L2 cache 230 and/or L1 cache 220). The prefetch chain may be terminated—i.e., the threshold request depth reached—or the prefetch chain may be "open"—i.e., members are still being added to the prefetch chain. Referring to reference numeral 1510, if a "prefetch hit" occurs within the prefetch chain, the prefetch chain is reinforced, as shown at block 1515. Referring again to reference numeral 1510, if a prefetch hit has not occurred within the prefetch chain, no new members (e.g., prefetched cache lines) are added to the prefetch chain.

Figure 16A:
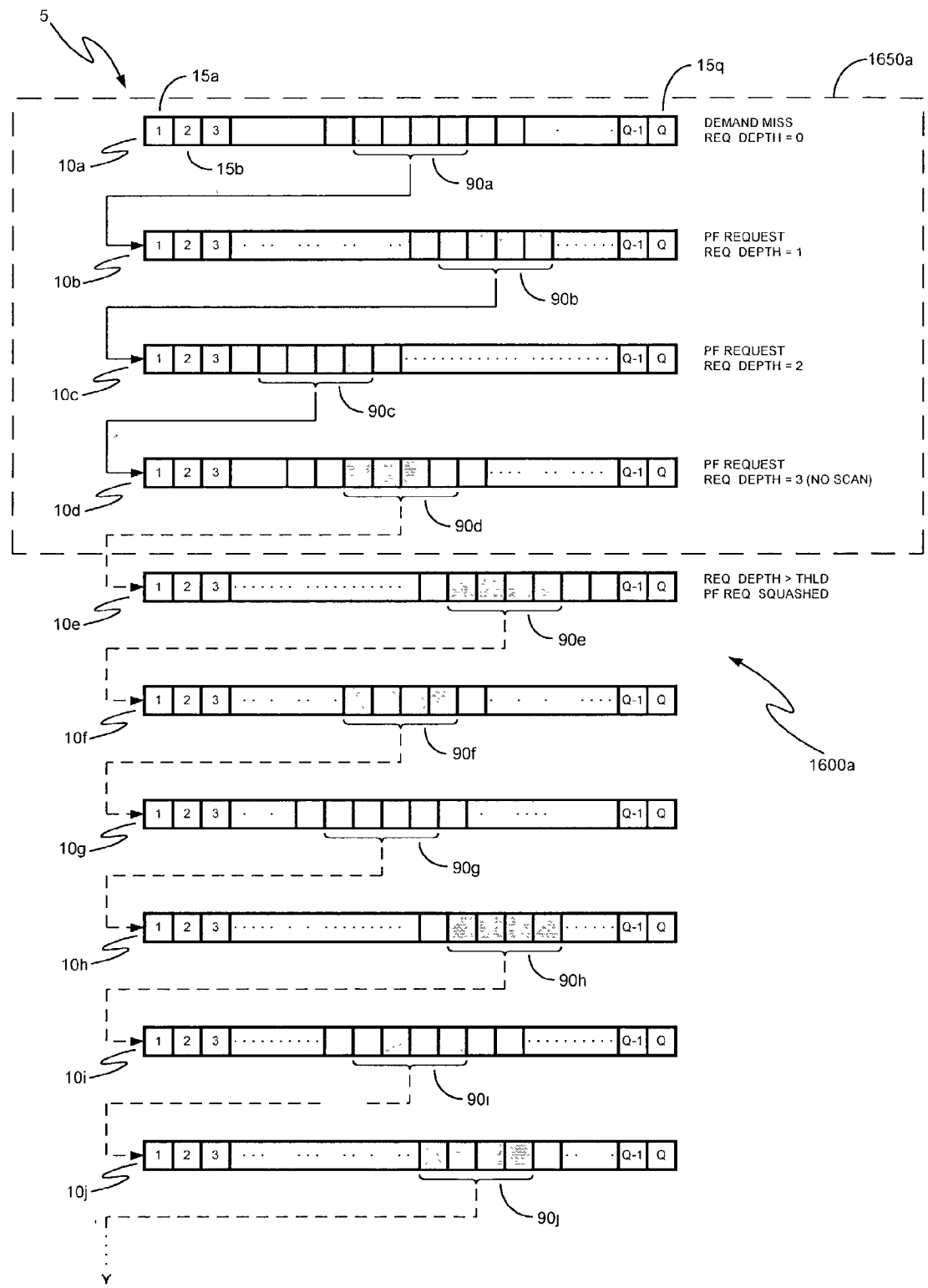
FIGS. 16A-16C show schematic diagrams illustrating the embodiment of the method of reinforcing a prefetch chain shown in FIG. 15.
Figure 16B:
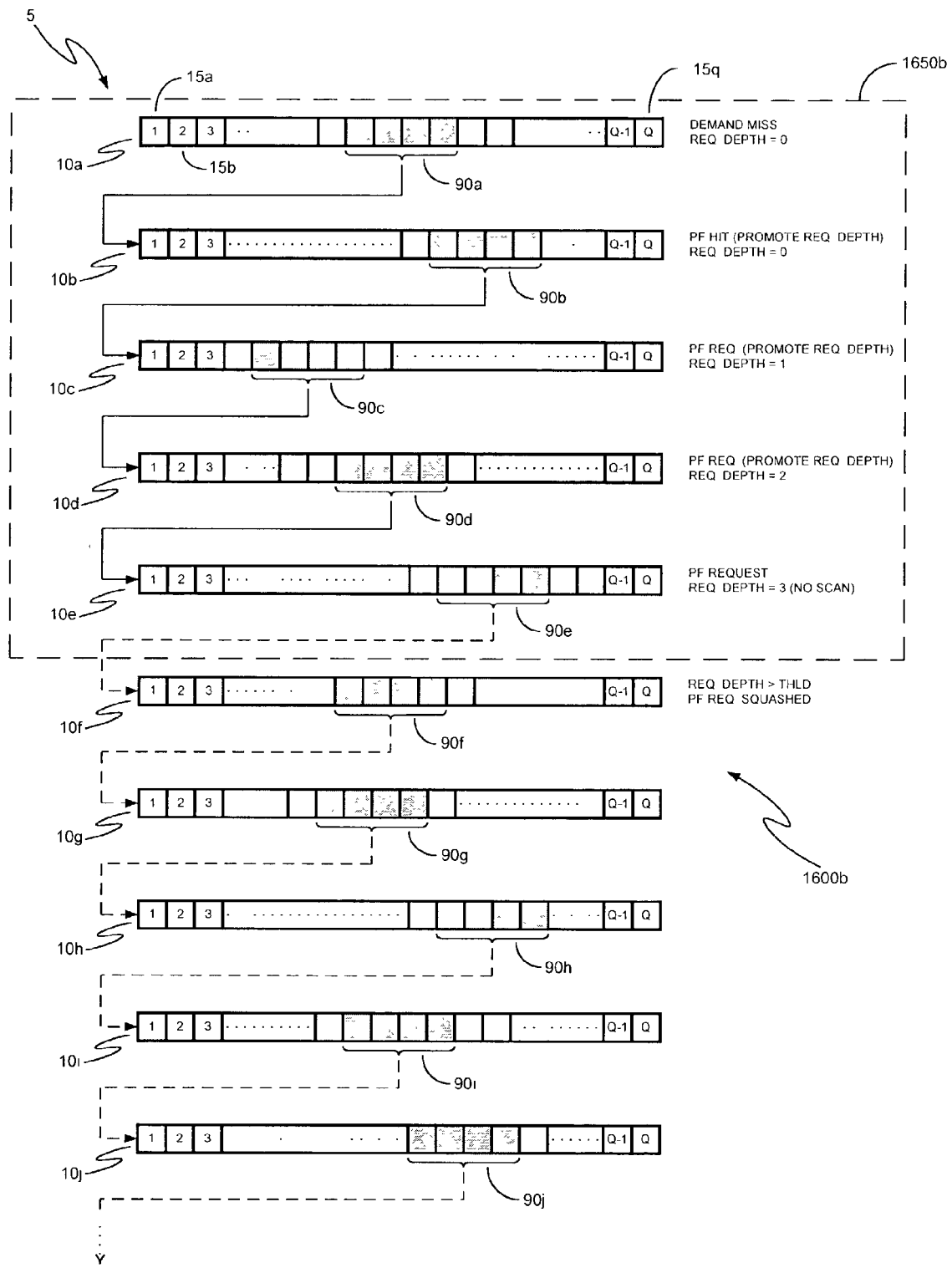
Figure 16C:
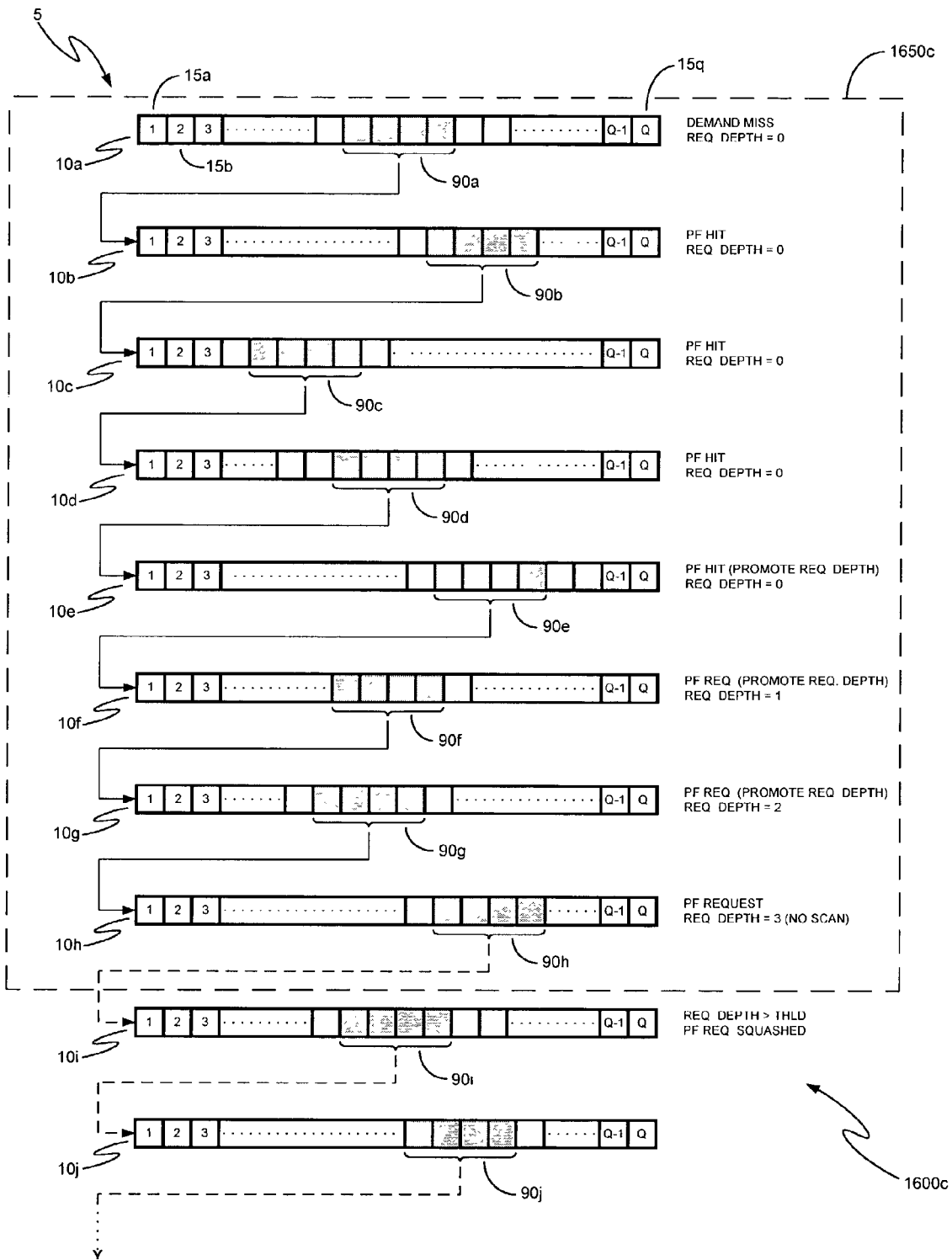

The method 1500 of reinforcing a prefetch chain may be better understood with reference to the example of FIGS. 16A through 16C. These figures depict the linked data structure 5 (see FIG. 14) at various states in the memory hierarchy. A first instance 1600*a* of the memory hierarchy is illustrated in FIG. 16A, a second instance 1600*b* of the memory hierarchy is illustrated in FIG. 16B, and a third instance 1600*c* of the memory hierarchy is shown in FIG. 16C. For all cache lines 10*a-j* of data structure 5, only a single candidate virtual addresses is shown. Again, however, it should be understood that any of the cache lines 10*a-j* may include multiple candidate virtual addresses. Also, for the example of FIGS. 16A-C, the threshold request depth is again set to three (3).

Referring to FIG. 16A, a demand miss has occurred, causing cache line 10*a* to be retrieved from main memory 120 (or other element of the memory hierarchy) and stored in cache. The issuance of subsequent prefetch requests has resulted in cache lines 10*b*, 10*c*, and 10*d* being loaded from memory and cached. The cache line 10*d* has a request depth of three (3), which is equal to the threshold request, thereby terminating the prefetch chain (i.e., cache lines 10*a-d*). Note that cache line 10*e* would have a request depth greater than the threshold and, because cache line 10*d* was not scanned, a prefetch request for cache line 10*e* has essentially been squashed. Other members 10*e-j* of the linked data structure 5 have not been prefetched, and one could view those cache lines that have been loaded from memory and cached (i.e., cache lines 10*a-d*) as having fallen within a prefetch window 1650*a*.

Referring to FIG. 16B, a prefetch hit has occurred at cache line 10*b* (i.e., a demand request has been issued for data contained in cache line 10*b*). As illustrated in FIG. 15—see reference numerals 1510, 1515—the prefetch chain will be reinforced to reflect the demand reference to cache line 10*b*. To reinforce the prefetch chain, the request depth of the hit cache line 10*b* is promoted to the request depth associated with a demand miss (note that cache line 10*b* now contains data specifically requested by CPU core 210). Thus, the request depth of cache line 10*b* is promoted to zero (0). The cache line 10*b* is then scanned for candidate virtual addresses. It should be understood that cache line 10*b* is actually being re-scanned, as the result of the initial scan—i.e., identification of candidate virtual address 90*b*—is not stored in the memory hierarchy (although the cache line 10c corresponding to address 90b is stored in memory).

Upon scanning cache line 10b, candidate virtual address 90b will be identified, resulting in a prefetch request for cache line 10c. This prefetch request will not propagate past L2 cache 230—or, more generally, past the level of cache with which the content prefetcher 290 is coupled—because the cache line 10c was previously loaded from memory and cached. Cache line 10c was previously cached with a request depth of two (2), and the request depth of cache line 10c is also promoted. Cache line 10c will be promoted to a request depth of one (1), which is one more than the request depth of cache line 10b (promoted to zero). Cache line 10c is then re-scanned for candidate virtual addresses, and candidate virtual address 90c is found. Virtual address 90c points to cache line 90d, which was also previously cached with a request depth of three (3). The request depth of cache line 90d is similarly promoted, such that cache line 90d has a request depth of two (2) (or one greater than the promoted request depth of cache line 10c).

Referring back to FIG. 16A, the cache line 10d was not scanned during the instance 1600a the memory hierarchy, as this cache line's prior request depth (i.e., three) was equal to the threshold request depth. Thus, the prefetch chain was terminated at cache line 10d, although cache line 10d contains a candidate virtual address pointing to another member (i.e., cache line 10e) of the data structure 5. Returning to FIG. 16B, the cache line 10d is now scanned for the first time—again, the request depth of cache line 10d is now only two (2), which is less than the threshold request depth—and the candidate virtual address 90d identified. In response to identifying the candidate virtual address 90d, a prefetch request is issued for the cache line 10e. Cache line 10e is loaded from memory and stored in cache, thereby reinforcing the prefetch chain for data structure 5. Cache line 10e is assigned a request depth of three (3), which is one greater than the request depth of line 10d, and the prefetch chain is now terminated at cache line 10e. Stated another way, the prefetch window 1650b is now extended to encompasses an additional member (i.e., cache line 10e) of the data structure 5; however, a demand miss was not incurred to fetch the additional member. Thus, reinforcement has enabled the prefetch chain on linked data structure 5 to be perpetuated without incurring demand misses and, therefore, without increasing processor latency.

Referring now to FIG. 16C, successive prefetch hits have occurred at cache lines 10c and 10d, respectively. In response to each of the prefetch hits at cache lines 10c and 10d, the prefetch chain was reinforced and the request depth of each of lines 10c and 10d was promoted to zero. Reinforcement of the prefetch chain in response to the prefetch hit at cache line 10c expanded the prefetch window 1650c to include cache line 10f, whereas reinforcement of the prefetch chain in response to the prefetch hit at cache line 10d expanded the prefetch window 1650c to include cache line 10g, where the prefetch chain was again terminated.

As some later point in time, as also illustrated in FIG. 16C, a prefetch hit occurred at cache line 10e, and the prefetch chain will again be reinforced. The request depth of line 10e is promoted to zero (0), and cache line 10e is re-scanned for candidate virtual addresses. The scan of cache line 10e reveals candidate virtual address 90e, which results in a prefetch request being issued for cache line 10f, the request depth of cache line 10f being promoted to a request depth of one (1). Cache line 10f is also re-scanned for candidate virtual addresses, and the identification of candidate virtual address 90f in cache line 10f will lead to the prefetching of cache line 10g. Cache line 10g, which is promoted a request depth of two (2), is subsequently scanned for candidate virtual addresses. Virtual address 90g is identified in cache line 10 g and, in response, cache line 10h is prefetched. Cache line 10h has a request depth of three (3) and, because the threshold request depth has been reached, the prefetch chain is again terminated. However, the prefetch window 1650c has been extended down to encompass cache lines 10f-h without incurring the latency associated with a demand miss.

Figure 17:
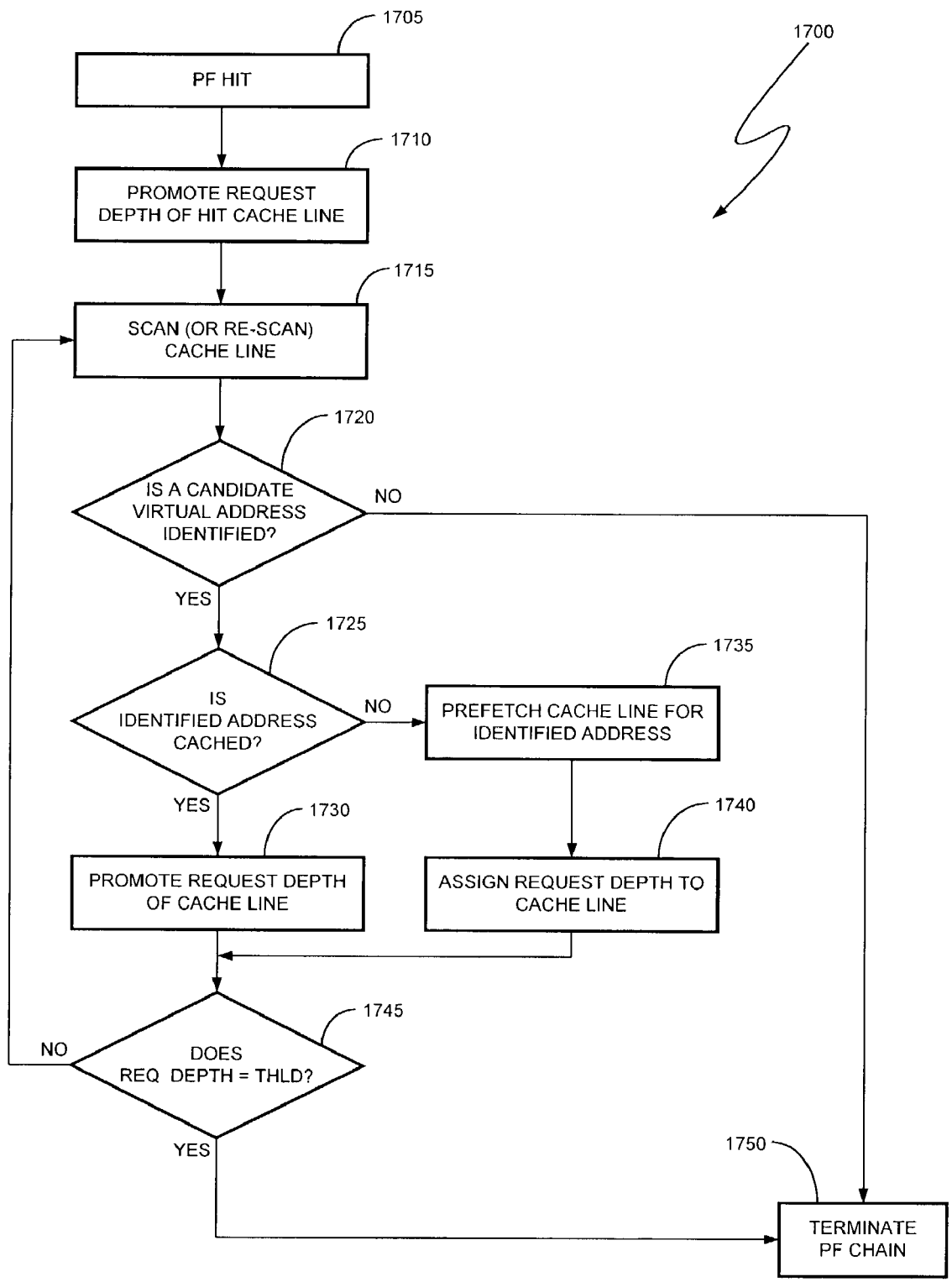
FIG. 17 is a flow chart illustrating another embodiment of the method of reinforcing a prefetch chain.

Another embodiment 1700 of the method of reinforcing a prefetch chain—as illustrated by the example of FIGS. 16A-C—is shown in FIG. 17. Referring to block 1705, a prefetch hit has occurred. The request depth of the hit cache line is promoted, as shown at block 1710. Generally, the request depth of the hit cache line is promoted to that associated with a demand miss (i.e., a request depth of zero). However, it should be understood that the request depth of a hit cache line may be promoted to any other suitable value (e.g., one). Referring to block 1715, the cache line is then scanned (or re-scanned). Note that, as illustrated in FIG. 2, the content prefetcher 290 may have access to the L1 fill traffic as well as the L1 miss traffic. Thus, a cache line stored in L2 cache 230 and being forwarded to L1 cache 220 in response to a demand request that missed at L1 cache 220 (an L1 miss)—i.e., the cache line stored in L2 cache 230 is the subject of a prefetch hit—can be re-scanned during reinforcement.

Referring to reference numeral 1720, if a candidate virtual address is identified, the request depth of the cache line corresponding to the candidate virtual address is promoted (see block 1730) if this cache line is stored in cache (see block 1725)—i.e., the corresponding cache line was the subject of a prior prefetch request and is a member of the prefetch chain. However, if the cache line corresponding to the candidate virtual address is not in cache—see block 1725—a prefetch request is issued to prefetch this cache line, as shown at block 1735. Referring to block 1740, a request depth is assigned to (and/or determined for) the prefetched cache line. The request depth to which the cache line is promoted, or the request depth that is assigned, will be one greater than the request depth of the preceding cache line.

Referring to reference numeral 1745 in FIG. 17, if the request depth (whether promoted or assigned) is less than the threshold request depth, the cache line is scanned for candidate virtual addresses—see block 1715—and the process repeated for any candidate virtual addresses (see reference numerals 1720, 1725, 1730, 1735, 1740). Referring again to reference numeral 1745, if the request depth equals (or exceeds) the threshold request depth, the prefetch chain is terminated, as illustrated by block 1750. Also, note that if a candidate virtual address is not identified during the scan of a cache line—see reference numeral 1720—the prefetch chain is similarly terminated, as shown at block 1750.

Referring again to block 1735 in FIG. 17, a prefetch request issued for a cache line during reinforcement may match an in-flight memory transaction (i.e., a prior prefetch request was already issued for that cache line). In the event of two such matching memory transactions, the memory transactions are merged to form a single prefetch request. The cache line retrieved from memory based upon this merger of prefetch requests will have a reinforced request depth—i.e., a promoted request depth. In other words, reinforcement transactions take precedence over "regular" memory prefetch transactions.

Figure 18:
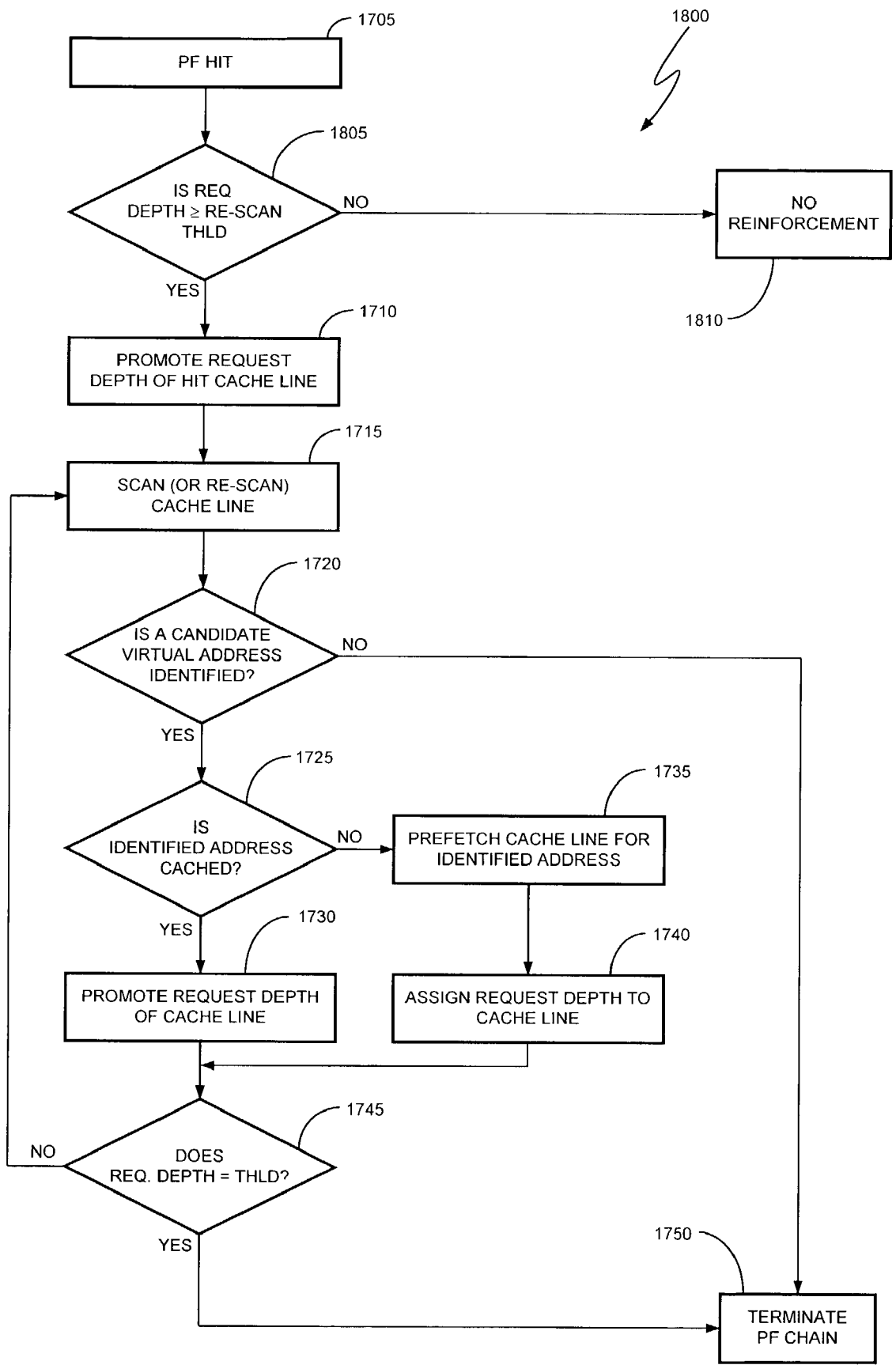
FIG. 18 is a flow chart illustrating a further embodiment of the method of reinforcing a prefetch chain.

A further embodiment 1800 of the method of reinforcing a prefetch chain is illustrated in FIG. 18. The method 1800 of FIG. 18 is similar to the method 1700 shown and described with respect to FIG. 17, and those elements in FIG. 18 that are the same as those illustrated in FIG. 17 have retained the same numerical designation. Further, discussions of those elements described above with respect to FIG. 17 are not repeated in following description of the method 1800 shown in FIG. 18.

The method 1800 of FIG. 18 incorporates the concept of a "scan threshold." If the request depth of a hit cache line is less than the scan threshold, the prefetch chain will not be reinforced and no members (e.g., elements of a linked data structure) will be added to the prefetch chain. Thus, if a hit cache line's request depth is less than the scan threshold, that cache line will not be scanned (or re-scanned) and its request depth will not be promoted. However, if the request depth of a hit cache line is greater than or equal to the scan threshold, promotion will occur and the hit cache line will be scanned for candidate virtual addresses, such that the prefetch chain can be reinforced.

Referring now to FIG. 18, a prefetch hit has occurred, as shown at block 1705. If the request depth of the hit cache line is less than the scan threshold—see reference numeral 1805—the prefetch chain is not reinforced, as shown at block 1810. Conversely, referring again to reference numeral 1805, if the request depth of the hit cache line is greater than or equal to the scan threshold, the hit cache line's request depth is promoted (see block 1710). The hit cache line is then scanned (or re-scanned), as shown at block 1715, and the process for reinforcing the prefetch chain is performed, as described above (see reference numerals 1720, 1725, 1730, 1735, 1740, 1745, 1750).

Figure 19A:
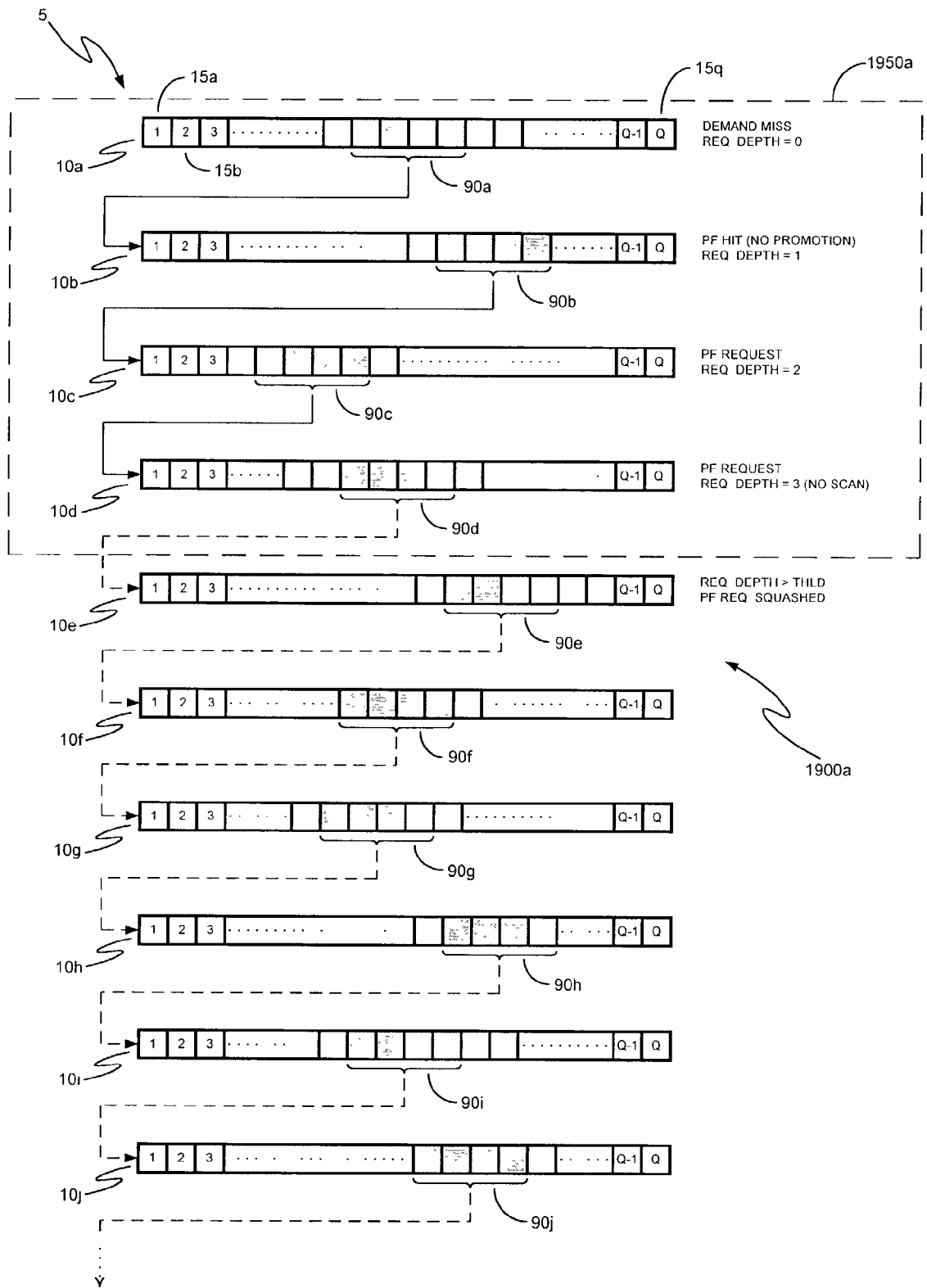
FIGS. 19A-19B show schematic diagrams illustrating the embodiment of the method of reinforcing a prefetch chain shown in FIG. 18.
Figure 19B:
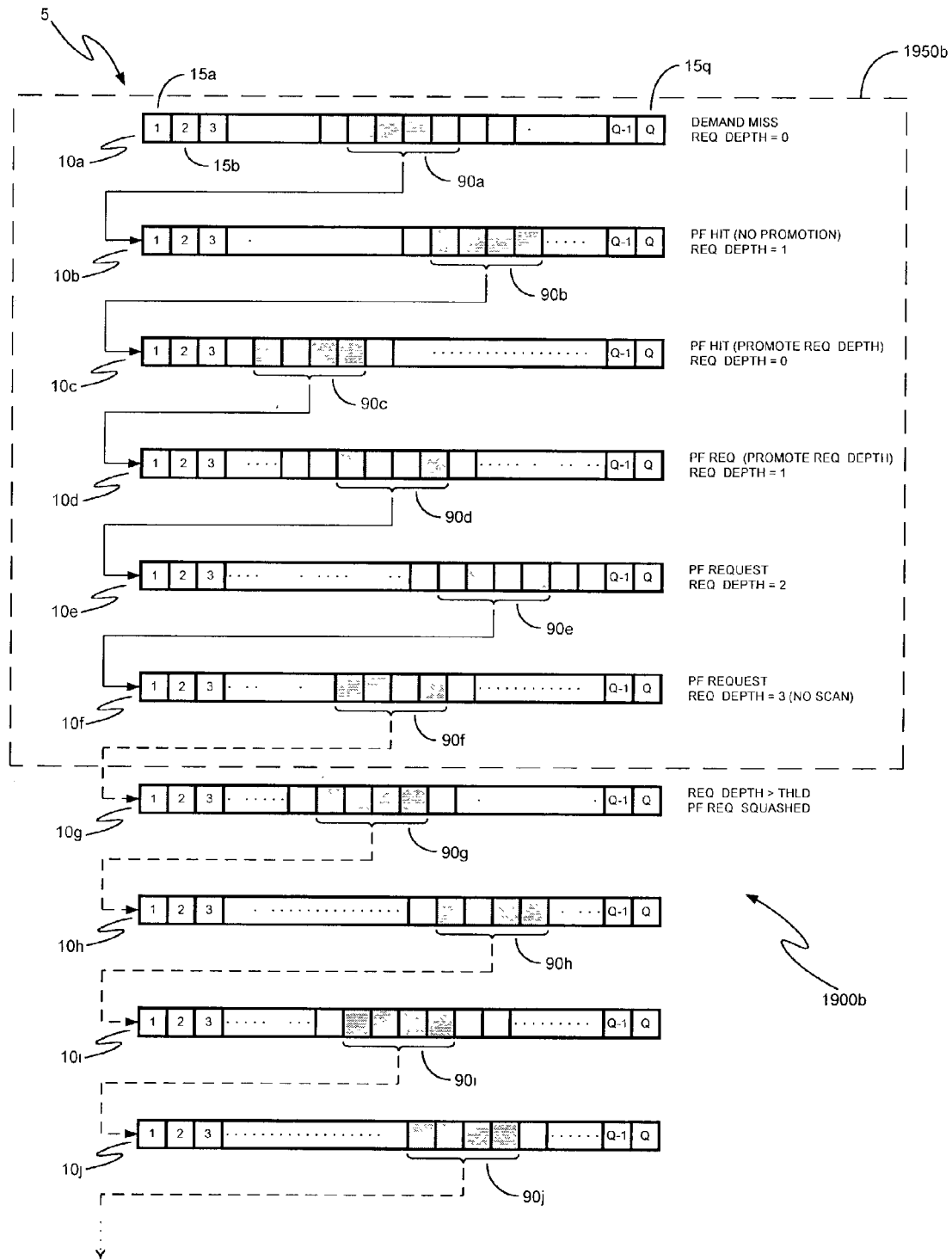

The method 1800 of FIG. 18 may be better understood with reference to the example presented in FIGS. 19A and 19B. These figures depict the linked data structure 5 (see FIGS. 16A-C) at various states in the memory hierarchy. A first instance 1900a of the memory hierarchy is illustrated in FIG. 19A, and a second instance 1900b of the memory hierarchy is illustrated in FIG. 19B. For all cache lines 10a-j of data structure 5, only a single candidate virtual addresses is shown, and, once again, it should be understood that any of the cache lines 10a-j may include multiple candidate virtual addresses. Also, for the example of FIGS. 19A-B, the threshold request depth is again set to three (3), and the scan threshold is set to two (2).

Referring to FIG. 19A, a demand miss has occurred, causing cache line 10a to be retrieved from main memory 120 (or other element of the memory hierarchy) and stored in cache. The issuance of subsequent prefetch requests has resulted in cache lines 10b, 10c, and 10d being loaded from memory and cached, these cache lines initially having requests depths of one (1), two (2), and three (3), respectively. The prefetch chain has been terminated at cache line 10d, which has a request depth equal to the threshold request depth (i.e., three). Again, note that cache line 10e would have a request depth greater than the threshold and, because cache line 10d was not scanned, a prefetch request for cache line 10e has essentially been squashed. Other members of the linked data structure 10a-10j have not been prefetched, and one those cache lines that have been loaded from memory and cached (i.e., cache lines 10a-d) are encompassed within a prefetch window 1950a.

Still referring to FIG. 19A, a prefetch hit has occurred at cache line 10b, which has a request depth of one (1). However, because the hit cache line's request depth is less than the scan threshold (i.e., two), the hit cache line's request depth is not promoted and the prefetch chain is not reinforced. Thus, the prefetch window 1950a is not enlarged and no members (of data structure 5) are added to the prefetch chain. The request depth of cache line 10b is unchanged and remains at one (1).

Referring now to FIG. 19B, a prefetch hit has occurred at cache line 10c. The hit cache line has a request depth of two (2), which equals the scan threshold of two. Thus, the request depth of the hit cache line 10c is promoted (e.g., to zero) and the hit cache line 10c is also scanned for candidate virtual addresses, thereby reinforcing the prefetch chain. The scan of cache line 10c leads to a chain of prefetches that results in cache lines 10e and 10f being added to the prefetch chain, which are within the prefetch window 1950b. The cache line 10f has a request depth of three (3), which is equal to the threshold request depth, and the prefetch chain is again terminated at cache line 10f. However, a demand miss was not incurred to add the additional members (10e, 10f) to the prefetch chain on linked data structure 5.

The threshold request depth may be set to any suitable value. The threshold request depth provides an indication of the degree to which a prefetch request is speculative, and setting the threshold request depth to high may result in a prefetch window that is highly speculative (i.e., that includes prefetched data unlikely to be needed by the CPU core 210). Efficiency issues should also be considered in setting the threshold request depth. Without reinforcement, a low threshold request depth may lead to premature termination of a prefetch chain and, hence, to missed prefetch opportunities, but the capability to reinforce and re-establish a terminated prefetch chain alleviates the problem of premature termination. However, it is much more desirable to incur a prefetch hit (followed by reinforcement of the prefetch chain) than to incur a demand miss. Thus, the threshold request depth should be set sufficiently large to provide a prefetch window that is likely to include data imminently needed by CPU core 210. Stated another way, the threshold request depth should be set at value that is large enough to provide a "prefetch hit efficient" prefetch window that results in minimal demand misses, but that is not so large as to cause highly speculative prefetches. A threshold request depth in the range of three (3) to nine (9) is believed suitable.

The scan threshold will be less than or equal to the threshold request depth. For example, where the threshold request depth is three (3), the scan threshold could be two (2). Similarly, where the threshold request depth is five (5), the scan threshold could be three (3). Efficiency considerations also play a role in selection of the scan threshold, as the scan threshold delays reinforcement until a prefetch chain has been traversed to a request depth equal to the scan threshold, thereby conserving memory resources. However, care should be taken in setting the scan threshold to insure that the CPU core 210 does not have to "wait" on data that, absent a high scan threshold, would otherwise have been prefetched and timely made available to the CPU core 210.

Embodiments of a content prefetcher 290 having a reinforcement mechanism and embodiments 1500, 1700, 1800 of a method of reinforcing a prefetch chain having been herein described, those of ordinary skill in the art will appreciate the advantages thereof. Reinforcement of a prefetch chain insures that "good" prefetch chains are traversed, whereas "bad" prefetch chains are dropped. Often times, a prefetch chain is prematurely terminated due to the threshold request depth, as well as a other causes, including data losses and/or a full arbiter buffer. The reinforcement mechanism allows such a terminated prefetch chain to be re-established. Further, prefetch chain reinforcement minimizes demand misses and decreases processing latency, thereby improving processor efficiency.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method, comprising:
storing a prefetch chain in a cache memory, the prefetch chain having two or more cache lines, wherein a subsequently prefetched cache line of the prefetch chain is based upon fill content of a previous prefetched cache line, and wherein each of the two or more cache lines comprises a request depth; and
in response to a prefetch hit at a cache line of the prefetch chain, reinforcing the prefetch chain to perpetuate the prefetch chain by updating the cache line request depth of the hit cache line.

2. The method of claim 1, further comprising terminating the reinforced prefetch chain.

3. The method of claim 2, wherein the reinforced prefetch chain is terminated at a threshold request depth.

4. The method of claim 1, wherein the prefetch chain is stored in an on-chip cache memory.

5. A method comprising:
storing a prefetch chain in an initial state, wherein the prefetch chain includes two or more cache lines, wherein a subsequently prefetched cache line of the prefetch chain is based upon fill contents of a previous prefetched cache line, and wherein each of the two or more cache lines comprises a request depth; and
in response to a prefetch hit at a cache line of the prefetch chain, reinforcing the prefetch chain to perpetuate the prefetch chain if a request depth of the hit cache line is greater than or equal to a scan threshold.

6. The method of claim 5, further comprising:
if the request depth of the hit cache line is less than the scan threshold, maintaining the prefetch chain at the initial state.

7. The method of claim 5, further comprising terminating the reinforced prefetch chain at a threshold request depth.

8. The method of claim 7, wherein the threshold request depth comprises a request depth in a range of from 3 to 9.

9. The method of claim 8, wherein the scan threshold comprises a request depth that is less than the threshold request depth.

10. A method comprising:
storing a prefetch chain in a cache memory, wherein the prefetch chain includes two or more cache lines, wherein a subsequently prefetched cache line of the prefetch chain is based upon fill contents of a previous prefetched cache line, and wherein each of the two or more cache lines comprises a request depth; and
in response to a prefetch hit at a cache line of the prefetch chain, promoting a request depth of the hit cache line to perpetuate the prefetch chain and scanning the hit cache line for candidate virtual addresses.

11. The method of claim 10, further comprising:
identifying a candidate virtual address in the hit cache line, the candidate virtual address pointing to a second cache line;
if the second cache line is stored in the cache memory, promoting a request depth of the second cache line; and
if the second cache line is not in the cache memory, prefetching the second cache line and assigning a request depth to the second cache line.

12. The method of claim 11, further comprising:
if the request depth of the second cache line is less than a threshold request depth, scanning the second cache line for candidate virtual address; and
if the request depth of the second cache line equals the threshold request depth, terminating the prefetch chain.

13. The method of claim 10, further comprising terminating the prefetch chain if no candidate virtual address is found in the hit cache line.

14. The method of claim 10, wherein the request depth of the hit cache line is promoted to a request depth of a demand request.

15. The method of claim 14, wherein the request depth of a demand request equals zero.

16. The method of claim 12, wherein the threshold request depth comprises a request depth in a range of from 3 to 9.

17. A method comprising:
storing a prefetch chain in an initial state, wherein the prefetch chain includes two or more cache lines, wherein a subsequently prefetched cache line of the prefetch chain is based upon fill contents of a previous prefetched cache line, and wherein each of the two or more cache lines comprises a request depth; and
in response to a prefetch hit at a cache line of the prefetch chain, if a request depth of the hit cache line is greater than or equal to a scan threshold, promoting the request depth of the hit cache line to perpetuate the prefetch chain and scanning the hit cache line for candidate virtual address.

18. The method of claim 17, further comprising:
if the request depth of the hit cache line is less than the scan threshold, maintaining the prefetch chain in the initial state.

19. The method of claim 17, further comprising:
identifying a candidate virtual address in the hit cache line, the candidate virtual address pointing to a second cache line;
if the second cache line is stored in the cache memory, promoting a request depth of the second cache line; and
if the second cache line is not in the cache memory, prefetching the second cache line and assigning a request depth to the second cache line.

20. The method of claim 19, further comprising:
if the request depth of the second cache line is less than a threshold request depth, scanning the second cache line for candidate virtual address; and
if the request depth of the second cache line equals the threshold request depth, terminating the prefetch chain.

21. The method of claim 17, further comprising terminating the prefetch chain if no candidate virtual address is found in the hit cache line.

22. The method of claim 17, wherein the request depth of the hit cache line is promoted to a request depth of a demand request.

23. The method of claim 22, wherein the request depth of a demand request equals zero.

24. The method of claim 20, wherein the threshold request depth comprises a request depth in a range of from 3 to 9.

25. The method of claim 20, wherein the scan threshold is less than the threshold request depth.

26. A device, comprising:
a cache memory; and
a content prefetcher coupled with the cache memory, the content prefetcher to store a prefetch chain in the cache memory, the prefetch chain having two or more cache lines, wherein a subsequently prefetched cache line of the prefetch chain is based upon fill contents of a previous prefetched cache line, and wherein each of the two or more cache lines comprises a cache line request depth; and
in response to a prefetch hit at a cache line of the prefetch chain, reinforce the prefetch chain to perpetuate the prefetch chain by updating a cache line request depth of the cache line.

27. The device of claim 26, the content prefetcher to terminate the reinforced prefetch chain.

28. The device of claim 27, wherein the reinforced prefetch chain is terminated at a threshold request depth.

29. The device of claim 26, wherein the cache memory comprises an on-chip cache memory.

30. A device comprising:
a cache memory; and
a content prefetcher coupled with the cache memory, the content prefetcher to store a prefetch chain in the cache memory, the prefetch chain at an initial state, wherein the prefetch chain includes two or more cache lines, wherein a subsequently prefetched cache line of the prefetch chain is based upon fill contents of a previous prefetched cache line, and wherein each of the two or more cache lines comprises a request depth; and
in response to a prefetch hit at a cache line of the prefetch chain, reinforce the prefetch chain to perpetuate the prefetch chain if a request depth of the hit cache line is greater than or equal to a scan threshold.

31. The device of claim 30, the content prefetcher to maintain the prefetch chain at the initial state if the request depth of the hit cache line is less than the scan threshold.

32. The device of claim 30, the content prefetcher to terminate the reinforced prefetch chain at a threshold request depth.

33. The device of claim 32, wherein the threshold request depth comprises a request depth in a range of from 3 to 9.

34. The device of claim 33, wherein the scan threshold comprises a request depth that is less than the threshold request depth.

35. A system, comprising:
a bus;
a cache memory; and
a processor coupled with the bus and the cache memory, the processor including a content prefetcher, the content prefetcher to store a prefetch chain in the cache memory, the prefetch chain having two or more cache lines, wherein a subsequently prefetched cache line of the prefetch chain is based upon fill contents of a previous prefetched cache line, and wherein each of the two or more cache lines comprises a cache line request depth; and
in response to a prefetch hit at a cache line of the prefetch chain, reinforce the prefetch chain to perpetuate the prefetch chain by updating a cache line request depth of the cache line.

36. The system of claim 35, the content prefetcher to terminate the reinforced prefetch chain.

37. The system of claim 36, wherein the reinforced prefetch chain is terminated at a threshold request depth.

38. The method of claim 35, wherein the cache memory comprises part of the processor.

39. A system comprising:
a bus;
a cache memory; and
a processor coupled with the bus and the cache memory, the processor including a content prefetcher, the content prefetcher to store a prefetch chain in the cache memory, the prefetch chain at an initial state, wherein the prefetch chain includes two or more cache lines, wherein a subsequently prefetched cache line of the prefetch chain is based upon fill contents of a previous prefetched cache line, and wherein each of the two or more cache lines comprises a reciuest depth; and
in response to a prefetch hit at a cache line of the prefetch chain, reinforce the prefetch chain to perpetuate the prefetch chain if a request depth of the hit cache line is greater than or equal to a scan threshold.

40. The system of claim 39, the content prefetcher to maintain the prefetch chain at the initial state if the request depth of the hit cache line is less than the scan threshold.

41. The system of claim 39, the content prefetcher to terminate the reinforced prefetch chain at a threshold request depth.

42. The system of claim 41, wherein the threshold request depth comprises a request depth in a range of from 3 to 9.

43. The system of claim 42, wherein the scan threshold comprises a request depth that is less than the threshold request depth.

44. An article of manufacture, comprising:
a medium having content that, when accessed by a device, causes the device to store a prefetch chain in a cache memory, the prefect chain having two or more cache lines, wherein a subsequently prefetched cache line of the prefetch chain is based upon fill contents of a previous prefetched cache line, and wherein each of the two or more cache lines comprises a cache line request depth; and
in response to a prefetch hit at a cache line of the prefetch chain, reinforce the prefetch chain to perpetuate the prefetch chain by updating a cache line request depth of the cache line.

45. The article of manufacture of claim 44, wherein the content, when accessed, further causes the device to terminate the reinforced prefetch chain.

46. The article of manufacture of claim 45, wherein the reinforced prefetch chain is terminated at a threshold request depth.

47. The article of manufacture of claim 44, wherein the prefetch chain is stored in an on-chip cache memory.

48. An article of manufacture comprising:
a medium having content that, when accessed by a device, causes the device to store a prefetch chain in an initial state, wherein the prefetch chain includes two or more cache lines, wherein a subsequently prefetched cache line of the prefetch chain is based upon fill contents of a previous prefetched cache line, and wherein each of the two or more cache lines comprises a request depth; and
in response to a prefetch hit at a cache line of the prefetch chain, reinforce the prefetch chain to perpetuate the prefetch chain if a request depth of the hit cache line is greater than or equal to a scan threshold.

49. The article of manufacture of claim 48, wherein the content, when accessed, further causes the device to:
   if the request depth of the hit cache line is less than the scan threshold, maintain the prefetch chain at the initial state.

50. The article of manufacture of claim 48, wherein the content, when accessed, further causes the device to terminate the reinforced prefetch chain at threshold request depth.

51. The article of manufacture of claim 50, wherein the threshold request depth comprises a request depth in a range of from 3 to 9.

52. The article of manufacture of claim 51, wherein the scan threshold comprises a request depth that is less than the threshold request depth.

* * * * *

UNITED STATES PATENT AND TRADEMARK OFFICE
CERTIFICATE OF CORRECTION

PATENT NO. : 7,260,704 B2  Page 1 of 1
APPLICATION NO. : 10/164345
DATED : August 21, 2007
INVENTOR(S) : Cooksey et al.

It is certified that error appears in the above-identified patent and that said Letters Patent is hereby corrected as shown below:

In column 22, at line 18, delete "reciuest" and insert --request--.

Signed and Sealed this

Twenty-seventh Day of May, 2008

JON W. DUDAS
*Director of the United States Patent and Trademark Office*